United States Patent
Wang et al.

(10) Patent No.: US 7,200,675 B2
(45) Date of Patent: Apr. 3, 2007

(54) SUMMARY-BASED ROUTING FOR CONTENT-BASED EVENT DISTRIBUTION NETWORKS

(75) Inventors: Yi-Min Wang, Bellevue, WA (US); Lili Qiu, Bellevue, WA (US); Chad E. Verbowski, Bellevue, WA (US); Demetrios Achlioptas, Seattle, WA (US); Gautam Das, Redmond, WA (US); Per-Ake Larson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 864 days.

(21) Appl. No.: 10/389,623

(22) Filed: Mar. 14, 2003

(65) Prior Publication Data

US 2004/0181588 A1   Sep. 16, 2004

(51) Int. Cl.
  *G06F 15/173* (2006.01)
  *G06F 15/16* (2006.01)
(52) U.S. Cl. ...................... 709/238; 709/245
(58) Field of Classification Search ............... 709/203, 709/207, 219, 245, 238, 240
  See application file for complete search history.

(56) References Cited

U.S. PATENT DOCUMENTS

| | | | |
|---|---|---|---|
| 6,182,143 B1 * | 1/2001 | Hastings et al. | 709/231 |
| 6,202,093 B1 * | 3/2001 | Bolam et al. | 709/225 |
| 6,298,455 B1 * | 10/2001 | Knapman et al. | 714/43 |
| 6,334,151 B1 * | 12/2001 | Bolam et al. | 709/225 |
| 6,336,119 B1 * | 1/2002 | Banavar et al. | 707/104.1 |
| 6,728,715 B1 * | 4/2004 | Astley et al. | 707/10 |
| 6,760,340 B1 * | 7/2004 | Banavar et al. | 370/408 |
| 6,910,033 B2 * | 6/2005 | Rosenblum | 707/3 |
| 6,961,728 B2 * | 11/2005 | Wynblatt et al. | 707/10 |
| 7,050,432 B1 * | 5/2006 | Banavar et al. | 370/390 |

(Continued)

FOREIGN PATENT DOCUMENTS

EP   1043671 A2 * 10/2000

OTHER PUBLICATIONS

Aguilera, Marcos K. et al., "Matching Events in a Content-based Subscription System," *PODC '99*, Atlanta, GA, pp. 53-61 (1999).

(Continued)

*Primary Examiner*—William Vaughn
*Assistant Examiner*—Yemane M. Gerezgiher
(74) *Attorney, Agent, or Firm*—Wolf, Greenfield & Sacks, P.C.

(57) ABSTRACT

A system and method for enabling highly scalable multi-node event distribution networks through the use of summary-based routing, particularly event distribution networks using a content-based publish/subscribe model to distribute information. By allowing event routers to use imprecise summaries of the subscriptions hosted by matcher nodes, an event router can eliminate itself as a bottleneck thus improving overall event distribution network throughput even though the use of imprecise summaries results in some false positive event traffic. False positive event traffic is reduced by using a filter set partitioning that provides for good subscription set locality at each matcher node, while at the same time avoiding overloading any one matcher node. Good subscription set locality is maintained by routing new subscriptions to a matcher node with a subscription summary that best covers the new subscription. Where event space partitioning is desirable, an over-partitioning scheme is described that enables load balancing without repartitioning.

26 Claims, 15 Drawing Sheets

U.S. PATENT DOCUMENTS

2003/0135556 A1* 7/2003 Holdsworth ............... 709/206
2003/0188198 A1* 10/2003 Holdsworth et al. ........ 713/201
2004/0003064 A1* 1/2004 Astley et al. ............... 709/223

OTHER PUBLICATIONS

Banavar, Guruduth et al., "an Efficient Multicast Protocol for Content-Based Publish-Subscribe Systems," *ICDCS 1999*, pp. 262-272 (1999).

Bayer, Rudolf & E. McCreight, "Organization and Maintenance of Large Ordered Indexes," *Acta Informatica*, vol. 1, Fasc. 3, pp. 173-189 (1972).

Beckmann, Norbert, et al., "The R★-tree: An Efficient and Robust Access Method for Points and Rectangles," *SIGMOD 1990*, pp. 322-331 (1990).

Bloom, Burton H., "Space/Time Trade-offs in Hash Coding with Allowable Errors," *Communications of the ACM*, vol. 13, No. 7, pp. 422-426 (Jul. 1970).

Carazaniga, Antonio et al., "Design and Evaluation of a Wide-Area Event Notification Service," *ACM Transactions on Computer Systems*, vol. 19, No. 3, pp. 332-383 (Aug. 2001).

Carazaniga, Antonio et al., "Fast Forwarding for Content-Based Networking," *Technical Report CU-CS-922-01*, Department of Computer Science, University of Colorado, pp. 1-12 (Nov. 2001).

Carazaniga, Antonio and Alexander L. Wolf, "Fast Forwarding for Content-Based Networking," *Technical Report CU-CS-922-01*, Department of Computer Science, University of Colorado, pp. 1-15 (Sep. 2002).

Fabret, Francoise et al., "Filtering Algorithms and Implementation for Very Fast Publish/Subscribe Systems," *SIGMOD 2001*, 22 pgs. (May 2001).

Fan, Li et al., "Summary Cache: A Scalable Wide-Area Web Cache Sharing Protocol," *IEEE/ACM Transactions on Networking*, vol. 8, No. 3, pp. 281-293 (Jun. 2000).

Ferreira, C. E. et al., "The Node Capacitated Graph Partitioning Problem: A Computational Study," *Mathematical Programming*, No. 81, pp. 229-256 (1998).

Garcia, Yvan J. et al., "A Greedy Algorithm for Bulk Loading R-trees," *ACM-GIS 1998*, pp. 163-185 (1998).

Gough, John and Glenn Smith, "Efficient Recognition of Events in a Distributed System," *Proceedings of ACSC-18*, Adelaide, Australia, 7 pgs. (1995).

Gruber, R. E. et al., "The Architecture of the READY Event Notification Service," *Proceedings of the 19th IEEE International Conference on Distributed Computing Systems Middleware Workshop*, 6 pgs (1999).

Guttman, Antonin, "R-Trees: A Dynamic Index Structure for Spatial Searching," *SIGMOD 1984*, pp. 47-57 (1984).

Intanagonwiwat, Chalermek et al., "Directed Diffusion: A Scalable and Robust Communication Paradigm for Sensor Networks," *MOBICOM 2000*, pp. 56-67 (2000).

Liu, Zhen, et al., "Clustering Algorithms for Content-Based Publication-Subscription systems," *ICDCS 2002*, pp. 133-142 (2002).

Marais, Hannes and Krishna Bharat, "Supporting Cooperative and Personal Surfing with a Desktop Assistant," *Proceedings of ACM UIST'97*, pp. 129-138 (Oct. 1997).

Opyrchal, Lukasz, et al., "Exploiting IP Multicast in Content-Based Publish-Subscribe Systems," Proceedings of Middleware 2000, 23 pgs. (2000).

Rowstron, Antony et al., "SCRIBE: The Design of a Large-Scale Event Notification Infrastructure," *NGC2001*, London, 13 pgs. (Nov. 2001).

Segall, Bill and David Arnold, "Elvin has left the building: A publish/subscribe notification service with quenching," *Proceedings AUUG97 Australian Unix Users Group Annual Conference*, pp. 243-255 (1997).

Snoeren, Alex C. et al., "Mesh-Based Content Routing using XML," *SOSP 2001*, pp. 160-173 (2001).

Wang, Yi-Min et al., "The SIMBA User Alert Service Architecture for Dependable Alert Delivery," *Proceedings of IEEE International Conference on Dependable Systems and Networks*, pp. 463-474 (Jul. 2001).

Wong, Tina et al., "An Evaluation of Preference Clustering in Large-Scale Multicast Applications," *INFOCOM 2000*, pp. 451-460 (2000).

Yan, Tak W. and Hector Garcia-Molina, "The SIFT Information Dissemination System," *TODS*, vol. 24, No. 4, pp. 529-565 (1999).

Yu, Haobo et al., "A Hierarchical Proxy Architecture for Internet-scale Event Services," *WETICE 1999*, pp. 78-83 (1999).

Hendrickson et al., "A Multilevel Algorithm for Partitioning Graphs", *Proceedings of the 1995 ACM/IEEE conference on Supercomputing*, San Diego, CA, pp. 626-657 (1995).

* cited by examiner

FIG. 11A

| Route Event 1112 | Route Subscription 1114 | |
|---|---|---|
| Update Route 1108 | Subscription Summary 1104 | Add New Subscription 1110 |
| | | Subscriptions 1102 |
| Tune Routing Precision 1116 | | Match Event 1106 |

FIG. 11B

| Route Event 1112 | Route Subscription 1114 | |
|---|---|---|
| Update Route 1108 | Subscription Summary 1104 | Add New Subscription 1110 |
| | | Subscriptions 1102 |
| Tune Routing Precision 1116 | | Match Event 1106 |

SUMMARY-BASED ROUTING FOR CONTENT-BASED EVENT DISTRIBUTION NETWORKS

FIELD OF THE INVENTION

This invention pertains generally to computer networks, and, more particularly, to computer networks that use a publish/subscribe model to distribute information.

BACKGROUND OF THE INVENTION

Today's computer data networks span the globe and provide an ever increasing variety of information and types of information. A popular model for retrieving information is the request-response model. This is a model used, for example, by the World Wide Web: a Web client requests a Web page from a Web server and then waits until the Web server responds. This model is adequate for basic access to information, but as information consumers become more sophisticated, it quickly becomes inefficient for information consumers or information providers or both. As a general example, under the request-response model, a consumer only interested in changes to an item of information (e.g., a stock price) may be required to request the information over and over again until a change is detected in the response.

A model complimentary to request-response that is becoming increasingly popular is publish/subscribe. Under a publish/subscribe model, information consumers submit subscriptions covering events of interest to a publish/subscribe service. Then, whenever information providers publish events to the service, consumers are notified of those events to which they have subscribed. News alerts and stock quotes are classic examples of information suited to distribution via a publish/subscribe model. Examples of other applications that use a publish/subscribe model include instant messaging, online auctions and electronic commerce price databases.

In addition, new applications are emerging where software agents play the role of information consumer, for example, in communicating with sensors and devices to perform automation tasks, and in monitoring and executing routine business-to-business transactions. Software agents present additional scalability challenges to the design of a publish/subscribe system because they are able to significantly increase the total number of subscribers, they are able to handle very complex subscriptions, and they are able to receive and process notifications at a very high rate.

Early publish/subscribe systems used a flat channel subscription model. Information consumers subscribed to a named channel and received only events that an information provider published to that particular channel. An improvement over the flat channel subscription model is to arrange the channels into a hierarchy of topics and subtopics so that a subscriber to a topic receives any events published to the topic and any of its subtopics. Modem publish/subscribe systems are able to allow even more fine-grained selection of events by enabling subscriptions to events based on the content of an event.

A content-based publish/subscribe system specifies an event schema for a topic, which lists the names and types of attributes that appear in an event. A subscription filter associated with a subscription may then be specified as a conjunction of predicates on a subset of those attributes. For example, a "stock quotes" topic specifies an event schema with three attributes: Symbol, Price, and Volume. An example event is (Symbol=MSFT and Price=79.30 and Volume=40,000,000); an example subscription filter is (Symbol=MSFT and Price>80.00). In a further example, the topic is itself an attribute of the event schema, e.g., Topic, Symbol, Price and Volume, so that subscribing to a topic and/or subtopic is then an aspect of the more general content-based subscription mechanism.

A new content-based publish/subscribe service will typically begin with a single physical server that receives and stores subscriptions from each service subscriber, receives events from each service publisher, performs matching of each event against the subscriptions, and sends notifications to subscribers with matching subscriptions. However, a successful service will eventually require performance beyond the capabilities of a single physical server. For such a service, a network of physical servers and/or a distributed system architecture is required.

Some prior art systems have incorporated a network of physical servers by propagating each event published to the service to each of the physical servers in the network, but this technique has inherent inefficiencies. Some prior art systems have achieved better efficiency by using a precise subscription filter summary. In such systems, each physical server that hosts subscriptions calculates a precise summary of the subscription filters associated with the subscriptions. The precise filter summary is then propagated against the flow of events and used by upstream event routers to block unnecessary event traffic as early in the route as possible.

There are problems with prior art systems that use precise subscription filter summaries. One problem is that in practice a precise subscription filter summary becomes so complex that event routers become a system bottleneck, degrading overall system throughput. Another problem is that subscription filters associated with subscriptions hosted by a server sometimes have poor locality. When that is the case, a summary of the subscription filters is too broad to be effective in reducing event traffic.

To ensure continuing success for content-based publish/subscribe services, there is a need in the art to solve such problems.

BRIEF SUMMARY OF THE INVENTION

The invention provides a system and method that address shortcomings of the prior art described herein above. These and other advantages of the invention, as well as additional inventive features, will be apparent from the description of the invention provided herein with reference to an exemplary embodiment. The invention provides a system and method for summary-based routing in an event distribution network. More particularly, the invention is directed to enabling highly scalable multi-node event distribution networks through the use of summary-based routing. The invention has a particular relevance to an event distribution network using a content-based publish/subscribe model to distribute information.

An event router node of an event distribution network maintains an imprecise summary of the set of subscriptions hosted by each matcher node. If the event router node is overloaded, it reduces the precision of the imprecise summaries. Reducing the precision of the imprecise summaries allows the event router to process each event faster. If the event router load falls beneath some high threshold, then it increases the precision of the imprecise summaries. Increasing the precision of the imprecise summaries reduces the amount of false positive traffic routed to a matcher node. False positive traffic makes a matcher node work harder.

There is a balance point at some level of imprecision that optimizes the throughput of the event distribution network as a whole.

Subscriptions to be hosted by an event distribution network are divided among the matcher nodes of the event distribution network so as to provide good subscription locality to the set of subscriptions hosted by each matcher node, while at the same time avoiding overloading any one matcher node (i.e., ensuring that each set of subscriptions cover a corresponding area of event space). If a set of subscriptions has poor locality, the imprecise summary of the set of subscriptions will result in more false positive event traffic than if the set of subscriptions has good locality. Providing for good subscription locality further enhances the throughput of the event distribution network as a whole. Good subscription locality is maintained by routing new subscriptions to the matcher node with the subscription summary that best covers the new subscription.

Event space partitioning is sometimes desirable but event space partitioning is used in circumstances where subscription locality isn't applicable in the same way. When event space partitioning is desirable, the event space is over-partitioned and a set of event space partitions is assigned to each matcher node in order to provide for more fine-grained load balancing without repartitioning and, ultimately, to provide for enhanced event distribution network throughput, particularly when combined with event routing using imprecise summaries.

An event distribution network node is incorporated in highly scalable multi-node event distribution networks that use summary-based routing. Finally, an event distribution network node in accordance with particular embodiments of the invention is implemented in the context of an extended Web Services framework built around XML and SOAP standards and technologies.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 11A is a block diagram of an event distribution network node architecture in accordance with an embodiment of the invention.

FIG. 11B is a block diagram of an event distribution network node configured as an event router in accordance with an embodiment of the invention.

DETAILED DESCRIPTION OF THE INVENTION

Figure 1:
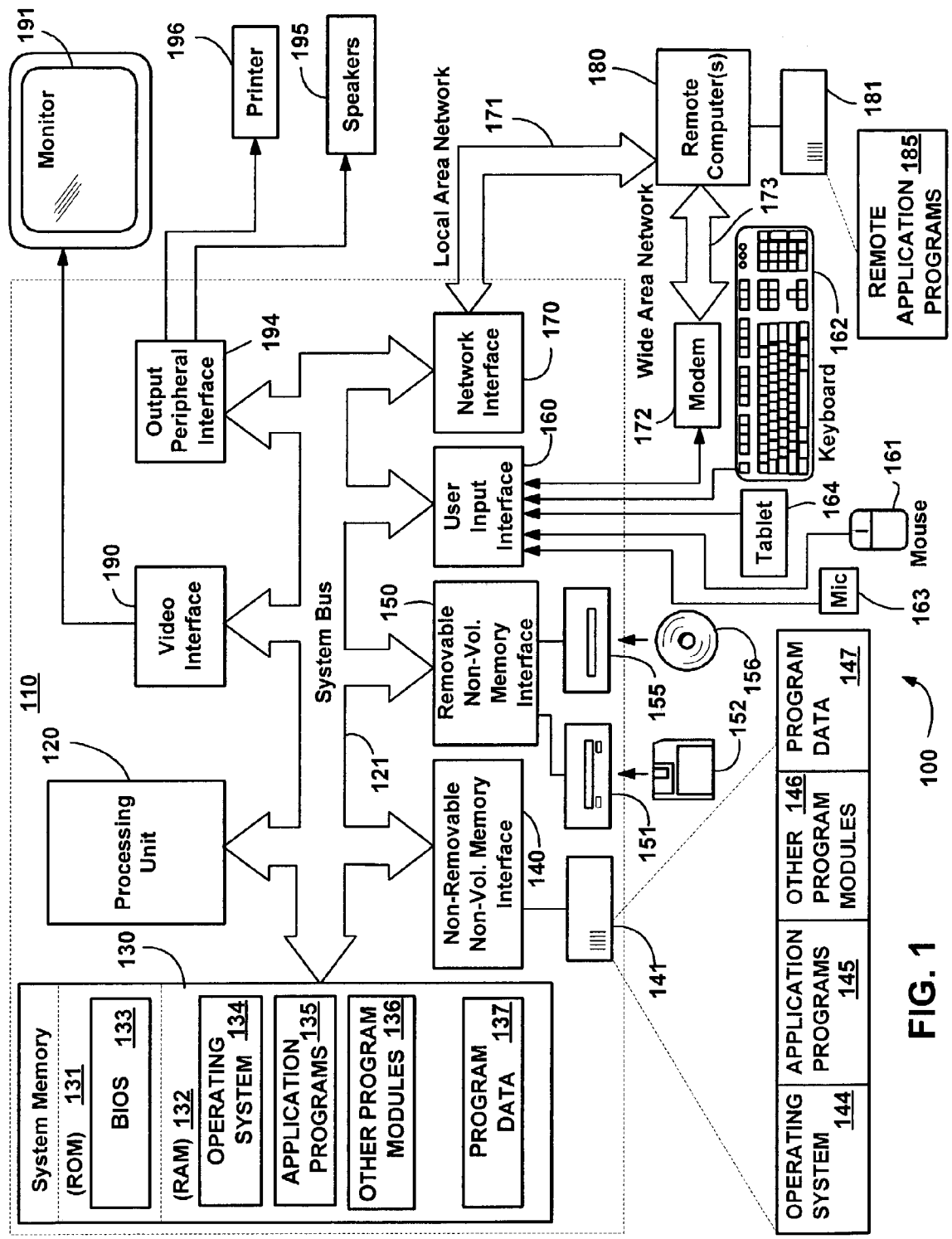
FIG. 1 is a schematic diagram generally illustrating an exemplary computer system usable to implement an embodiment of the invention.

The invention is embodied in an event distribution network utilizing summary-based routing. An event distribution network having event router nodes capable of maintaining an effective imprecise summary of the set of subscriptions hosted by a matcher node is disclosed herein. Routing using imprecise summaries allows an event router to route more events at the cost of some false positive event traffic. False positive event traffic reduces effective matcher node throughput of events but the overall effect on event distribution network throughput is potentially positive when properly exploited. Further reductions in false positive event traffic are achieved by partitioning the subscriptions to be hosted by the event distribution network among the plurality of matcher nodes such that each filter set partition has good locality. Simulations have shown the combined result of routing using imprecise summaries and partitioning for good locality to give a 200% improvement in event distribution network throughput compared to routing using precise summaries alone. A flexible event distribution network node suitable for building event distribution networks that embody the invention is also herein disclosed. In an embodiment of the invention, each event distribution network node is capable of automatically adjusting the level of summary precision it utilizes to route events in order to prevent itself becoming an event distribution network bottleneck, thus optimizing event distribution network throughput. In addition, each event distribution network node is capable of routing new subscriptions to an event distribution network node with a hosted subscription set summary that best matches the new subscription, thus maintaining good hosted subscription set locality without re-partitioning.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
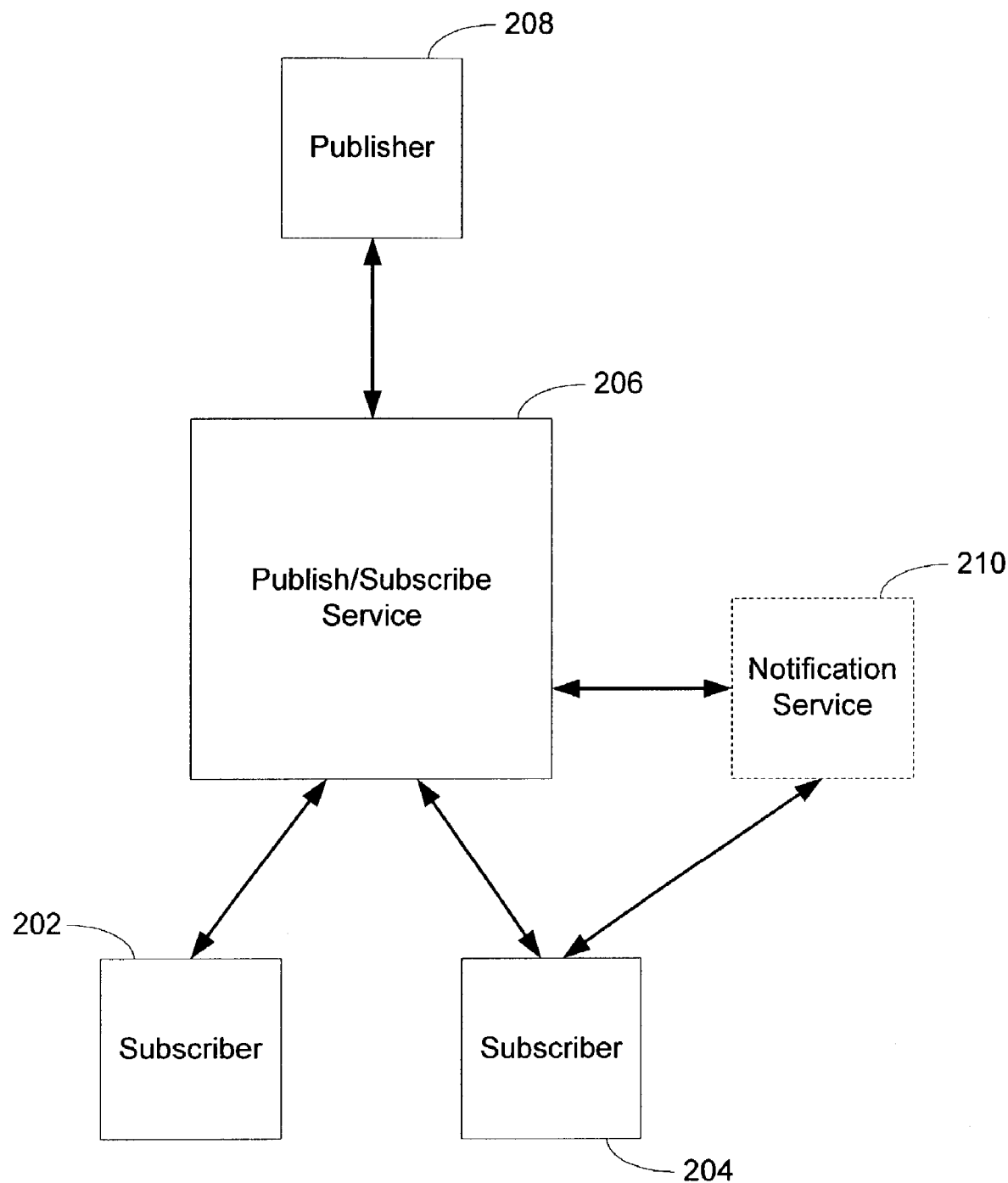
FIG. 2 is a schematic diagram of a publish/subscribe system in accordance with an embodiment of the invention.

FIG. 2 depicts an exemplary publish/subscribe system in accordance with an embodiment of the invention. In an embodiment of the invention, subscribers 202, 204 place subscriptions with a publish/subscribe service 206. The publish/subscribe service 206 hosts a subscription placed with the service 206 by one of the subscribers 202, 204. A publisher 208 publishes events to the service 206. When an event is published, the service 206 examines each of the subscriptions hosted by the service 206. If the event matches a subscription, the subscriber that placed the subscription is notified of the event. It is typical for a plurality of subscribers to receive notification of the same event. The service 206 may notify subscribers 202, 204 directly. Alternatively, the publish/subscribe service 206 may notify subscriber 206 via a notification service 210. The notification service 210 is optional but it is often the case that one is a part of a practical publish/subscribe system, for example, to provide a bridge between networks utilizing differing communication protocols and/or to store notifications during subscriber network connectivity interruptions. It is typically a goal of the publish/subscribe service 206 to notify the subscribers 202, 204 of a matching event as soon as possible.

As previously discussed, it is desirable to utilize a multi-node architecture to implement the publish/subscribe service 206. One reason is that a multi-node architecture is capable of being more reliable than a single node architecture, for example, the nodes may be arranged such that the failure of a single node does not disable the publish/subscribe service 206. Another reason is that a multi-node architecture better overcomes scalability hurdles by taking full advantage of parallel processing facilities, for example, in a distributed computing environment. Typically, one of the most process intensive aspects of the publish/subscribe service 206 is the matching of each published event to each of the hosted subscriptions. As a result, one goal of a multi-node architecture is simply to have several matcher nodes. However, to achieve high levels of efficiency, other node types are desirable.

Figure 3:
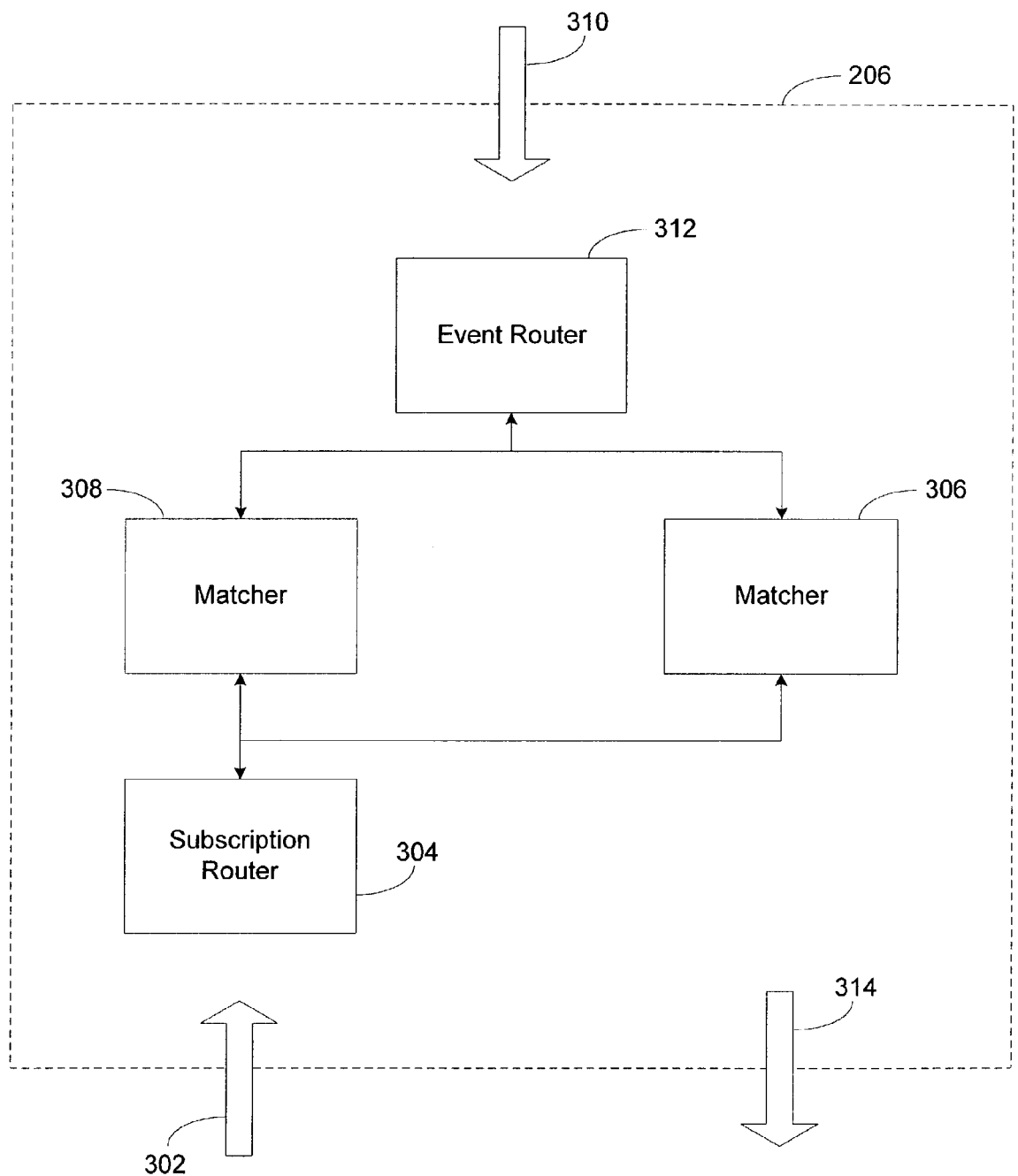
FIG. 3 is a schematic diagram of a multi-node publish/subscribe service in accordance with an embodiment of the invention.

FIG. 3 depicts one example of a multi-node publish/subscribe service in accordance with an embodiment of the invention. In this example, new subscriptions 302 are received by a dedicated subscription router node 304. The subscription router 304 then assigns the new subscription to one of two event matcher nodes 308, 306. Once assigned to one of the event matcher nodes 308, 306, a subscription remains hosted by that event matcher node unless reassigned. Although this example shows only two event matcher nodes 308, 306, embodiments in accordance with the invention are not so limited.

Newly published events 310 are received by a dedicated event router node 312. The event router 312 routes the newly published event to all, some or none of the event matcher nodes 308, 306 in the publish/subscribe service 206. It is typically a goal of the event router 312 to route a newly published event to less than all of the event matcher nodes 308, 306 if possible, in order to reduce the number of events received by the matcher nodes 308, 306.

One of the dedicated matcher nodes 308, 306 attempts to match each received event to each of the subscriptions hosted by the matcher nodes 308, 306. In an embodiment of the invention an event notification 314 is generated immediately for each match that occurs, but there are techniques to improve notification efficiency. For example, in one such technique, when a match occurs, a subscriber associated with the matching subscription is added to a list of subscribers to be notified of the newly published event. Once each of the subscriptions hosted by one of the matcher nodes 308, 306 have been examined, the ready one of the matcher nodes 308, 306 then generates the event notification 314 for each subscriber on the list of subscribers to be notified. In an embodiment of the invention that includes a notification service or where, for example, the underlying network transport mechanism supports a multi-cast facility, each of the matcher nodes 308, 306 generates a single notification for the event notification 314 that includes the list of subscribers to be notified.

For clarity, FIG. 3 depicts a relatively simple architecture for distributing events from publishers to subscribers, but aspects of the invention are able to be incorporated into much more sophisticated architectures and in fact, the benefits provided by the invention are even greater in more complex architectures. In an embodiment of the invention, an event distribution network (EDN) includes any number of nodes, each capable of communicating with any other, each capable of receiving events and subscriptions, each capable of performing matching and generating notifications. An EDN node is able to be dedicated to a particular role, such as, event router or matcher. However, an EDN node is able to serve multiple roles simultaneously, for example, event router and matcher. Furthermore, an EDN node is able to change its role or roles over time in order to, for example, adapt to changing event traffic conditions. In what follows, unless explicitly stated otherwise, matcher node, for example, may be read as "EDN node serving in the role of matcher." Event router node may be read as "EDN node serving in the role of event router," and so on.

Figure 4:
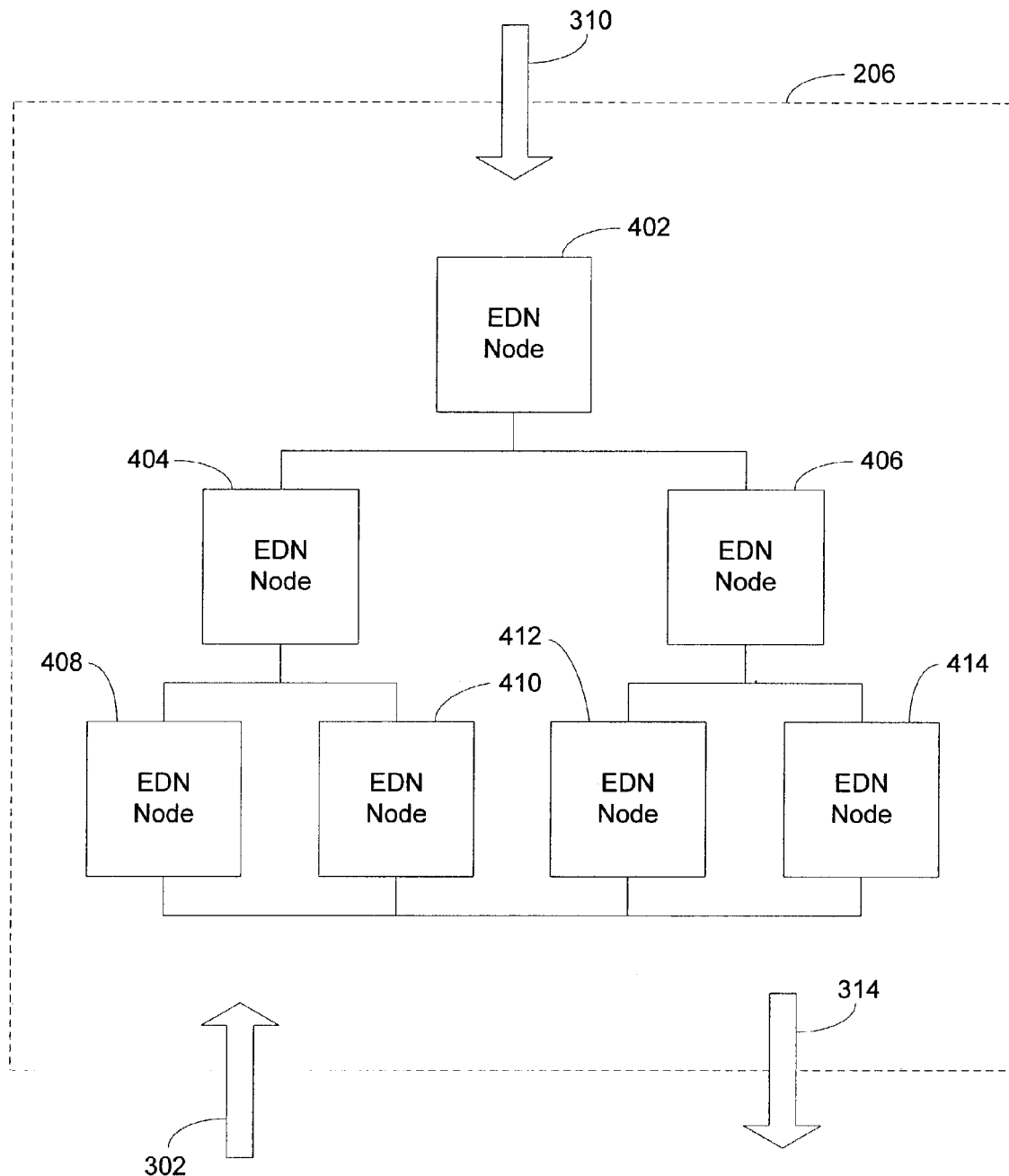
FIG. 4 is a schematic diagram of an event distribution network (EDN) in accordance with an embodiment of the invention.

FIG. 4 depicts one example of an event distribution network suitable for incorporating aspects of the invention. In the illustrated example, some EDN nodes 402, 404, 406 are well placed in the network to serve in the role of event router and the majority of the resources of those nodes is allocated to that role. Other EDN nodes 408, 410, 412, 414 have the majority of their resources allocated to the role of matcher. Each EDN node 402, 404, 406, 408, 410, 412, 414 allocates some resources to the role of subscription router. One EDN node 406 initially dedicates most of its resources to the role of event router, but over time it allocates more and more resources to the role of matcher in order to optimize utilization of the EDN node's resources.

Where multiple EDN nodes serve in the role of event router, they may be organized hierarchically in order, for example, to minimize event traffic within the event distribution network. For example, referring to FIG. 4, one EDN node 402 serves as a primary event router. Other EDN nodes 404, 406 serve as secondary event routers. A primary event router only routes events to secondary event routers. Such routing hierarchies may be hardwired but typically they are not, and in fact, they may be configured automatically and change dynamically utilizing techniques well known to the art.

Before going into the details of implementing an EDN node suitable for use in an event distribution network that incorporates aspects of the invention, it will be helpful to further describe aspects of events, subscriptions and related concepts.

In a content-based publish/subscribe system suitable for incorporating aspects of the invention, an event comprises one or more named attributes. Such an event is said to occur in an event space with a dimension corresponding to each attribute, for example, an event with two named attributes is a two dimensional event and occurs in a two dimensional event space. As another example, an event with named attributes: Symbol, Price and Volume, is a three dimensional event and occurs in a three dimensional event space. For clarity, the invention will be described with reference to a two dimensional event space but those of skill in the art will appreciate that the invention is not so limited and in fact, provides even greater benefits when incorporated into embodiments that distribute events with higher dimensionality.

In an embodiment of the invention, a subscription comprises a subscription filter and a notification address. In an embodiment of the invention, a notification address comprises a communications protocol address of a subscriber, for example, an internet protocol (IP) address. In an alternate embodiment of the invention, a notification address comprises a communications protocol address of a notification service and a device-independent subscriber identifier, for example, a .NET notification service and a NET Passport ID.

In an embodiment of the invention, a subscription filter comprises an expression that defines a set of events. In an embodiment of the invention, a subscription filter comprises a conjunction of predicates on a subset of the attributes of an event, for example, Symbol=MSFT and Price>80.00 and Price<120.00. In an embodiment of the invention, a subscription filter may be thought of as describing a rectangle of event space (or, equivalently, a volume of event space where the event space has more than two dimensions).

Figure 5:
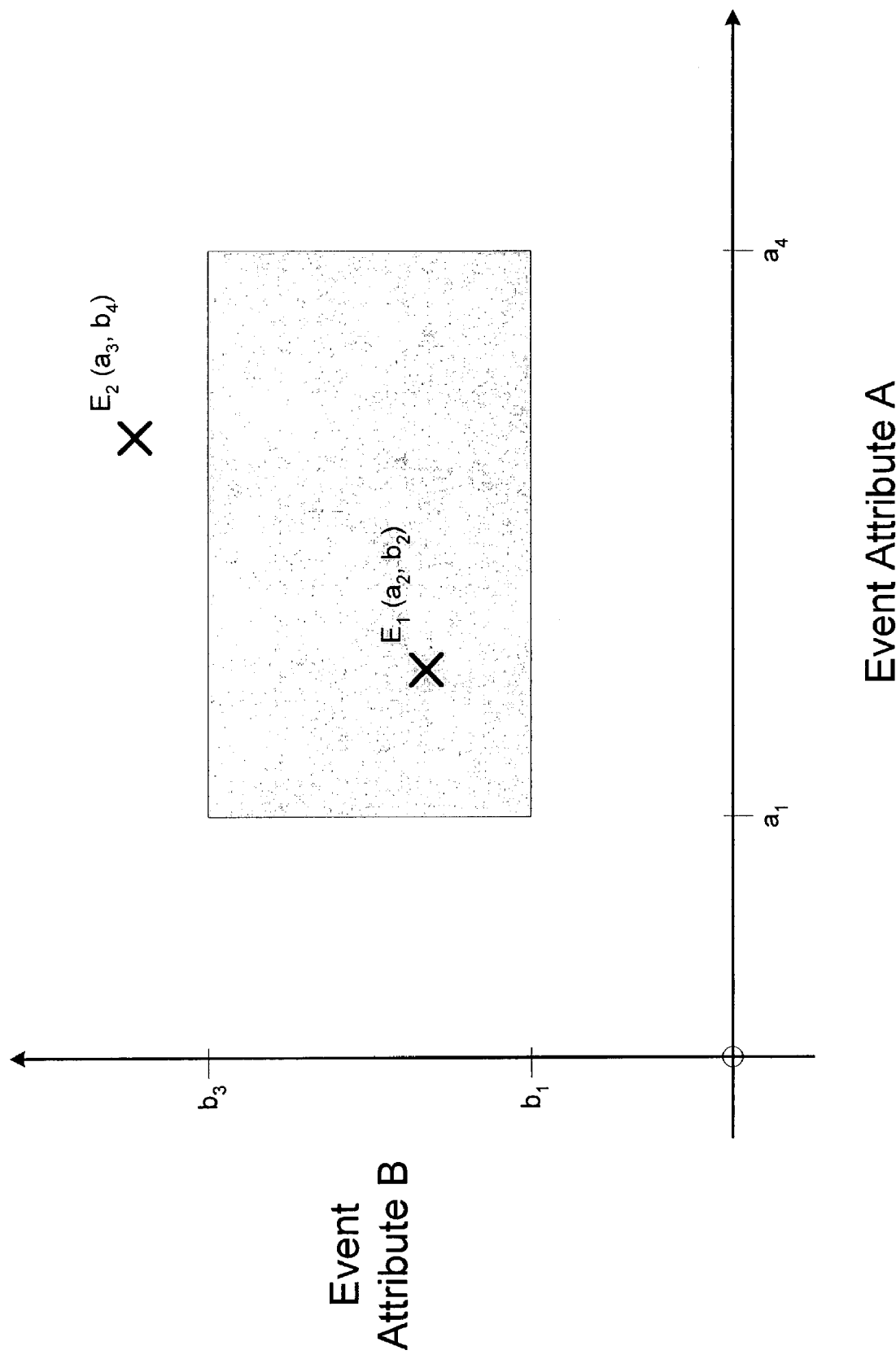
FIG. 5 is a graph showing a subscription rectangle and two events in a two dimensional event space.

FIG. 5 illustrates two events and a subscription filter in a two dimensional event space. Event attribute A is capable of taking on at least four values: $a_1$, $a_2$, $a_3$ and $a_4$ such that $a_1 < a_2 < a_3 < a_4$. Event attribute B is capable of taking on at least four values: $b_1$, $b_2$, $b_3$ and $b_4$ such that $b_1 < b_2 < b_3 < b_4$. One event $E_1$ is shown occurring at point $(a_2, b_2)$ in event space. A second event $E_2$ is shown occurring at point $(a_3, b_4)$ in event space. A subscription filter is shown as a rectangle of event space described by ($A > a_1$ and $A < a_4$ and $B > b_1$ and $B < b_3$). One event $E_1$ is within the rectangle of event space. That event $E_1$ matches the subscription filter. Equivalently, that event $E_1$ falls within the subscription filter. A second event $E_2$ is not within the rectangle of event space. That event $E_2$ does not match the subscription filter. Equivalently, that event $E_2$ does not fall within the subscription filter. An event matches a subscription if it matches the subscription filter associated with the subscription.

Figure 6:
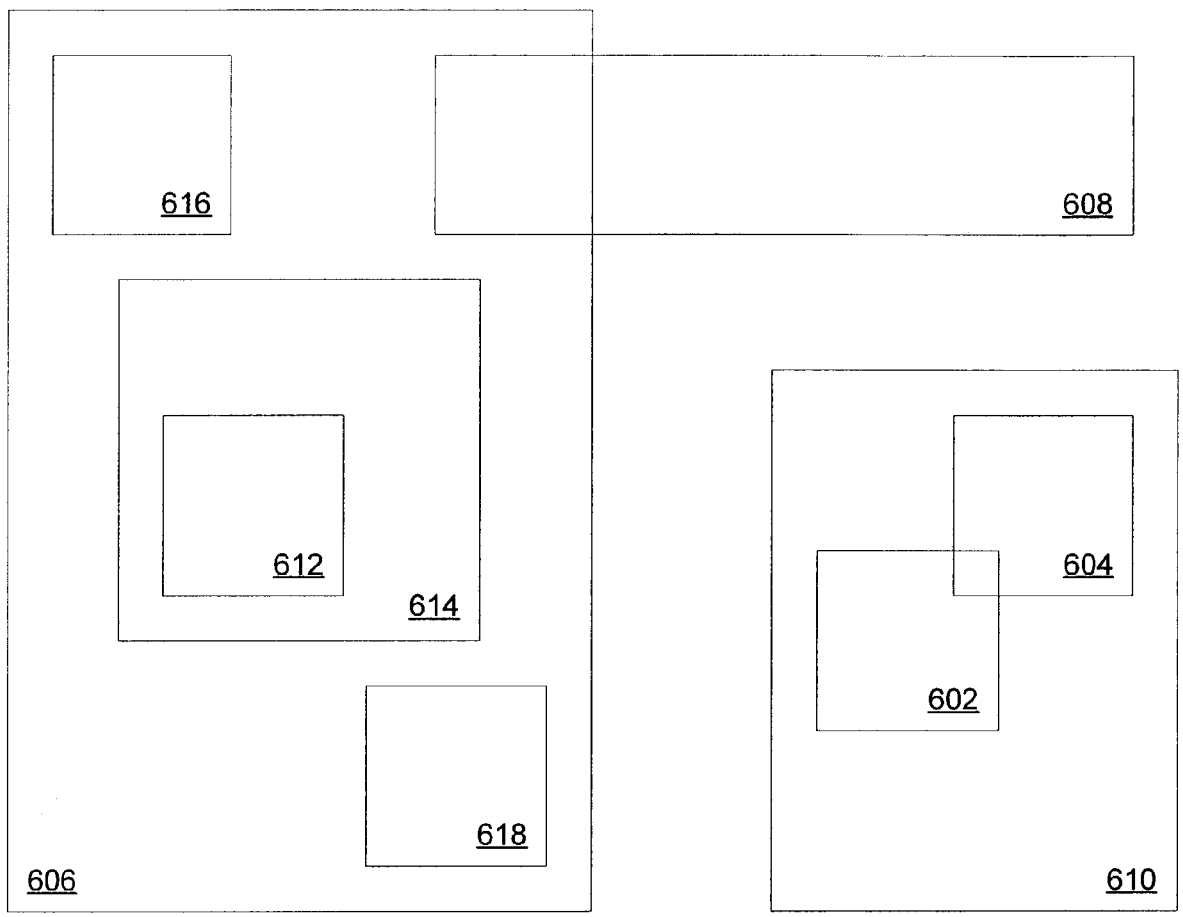
FIG. 6 is a schematic representation of event space showing of several subscription rectangles, some of which are covered by some others.

A publish/subscribe service suitable for incorporating aspects of the invention hosts a plurality of subscriptions. The subscription filters associated with the subscriptions may be visualized as a plurality of rectangles in an event space. Some of the filter rectangles may overlap. Some of the filter rectangles may entirely cover other rectangles. Popular areas of the event space may be covered by many filter rectangles. There may be areas of event space that are not covered by a filter rectangle. FIG. 6 illustrates several filter rectangles in an event space. Filter rectangles 602 and 604 overlap, as do filter rectangles 606 and 608. Filter rectangles 602 and 604 are covered by filter rectangle 610. Filter rectangle 612 is covered by filter rectangle 614, which is in turn covered by filter rectangle 606. Filter rectangles 616, 614, 618 and 612 are covered by filter rectangle 606.

A subscription filter describes a rectangle of event space. A set of subscription filters typically describe a more complex area of event space. It is typically possible to precisely describe that complex area of event space with less than all of the subscription filters in a set, for example, if some of the subscription filters in the set entirely cover others. A subscription filter in a set that is not entirely covered by another subscription filter is a maximal element of the set. In an embodiment of the invention, the maximal elements of a subscription filter set are a precise summary of the subscription filter set. A precise summary of a subscription filter set precisely describes the same area of event space as does the subscription filter set. For example, in the set of subscription filter rectangles illustrated in FIG. 6, filter rectangles 606, 610 and 608 are a precise summary of the set.

Subscription filter set summaries are useful for making routing decisions in an event distribution network. One of the behaviors typically expected of a publish/subscribe service is that each subscriber that has subscribed to an event will receive notification of the publication of the event. In a multi-node publish/subscribe service that meets this expectation, a newly published event must be routed to each matcher node that hosts a subscription to the event. One of the ways that an event router can meet this requirement is to route each event to each matcher node. Prior art event routers have used this "no summary" method, also known as multicast. Another way that an event router can meet this requirement is to route to a matcher only those events that fall within a precise summary of the subscription filter set associated with the subscriptions hosted by the matcher. Prior art event routers have used this "precise summary" method.

The no summary method of event routing and the precise summary method of event routing are two extremes of a spectrum of summary precisions that are useful in an embodiment of the invention for routing events in an event distribution network. An event router utilizing the no summary method is relatively simple to implement and requires relatively little processing power, but each matcher receives a relatively high number of events that do not match any of the subscriptions hosted by the matcher. An event router utilizing the precise summary method routes only those events to a matcher that will result in a match with one or more subscriptions hosted by the matcher. However, this event router must maintain a precise summary of the subscription filter set associated with the subscriptions hosted by a matcher for each of the matchers to which it routes events. In addition, the event router must itself match each newly published event to each precise summary.

In an embodiment of the invention, a goal of an event distribution network is to maximize the number of events that can be distributed in a given time period, that is, to maximize event distribution network throughput. Factors limiting throughput in an event distribution network include network bandwidth, matcher node throughput and event router node throughput. An event router node utilizing the no summary method and an event router node utilizing the precise summary method affect these throughput limits in different ways.

An event router node utilizing the no summary method to route events is not typically itself a limit to overall event distribution network throughput because of its low complexity. However, a matcher node must expend at least some resources to determine that an event does not match any of the subscriptions that it hosts. This is one reason that the throughput of a matcher node in an event distribution network utilizing no summary event routing is typically lower than the throughput of a matcher node in an event distribution network utilizing precise summary event routing. In addition, event distribution networks utilizing no summary event routing may require higher bandwidth and/or encounter a bandwidth limit to throughput.

An event router node utilizing the precise summary method of event routing reduces the number of events routed to a matcher node to a minimum necessary for correct operation. To be able to do so, however, in an embodiment of the invention the precise summaries used by an event router node are so complex that event router node throughput is reduced. Event router node throughput is reduced to the point that the event router node becomes a throughput limit, a bottleneck, for the event distribution network.

Figure 7:
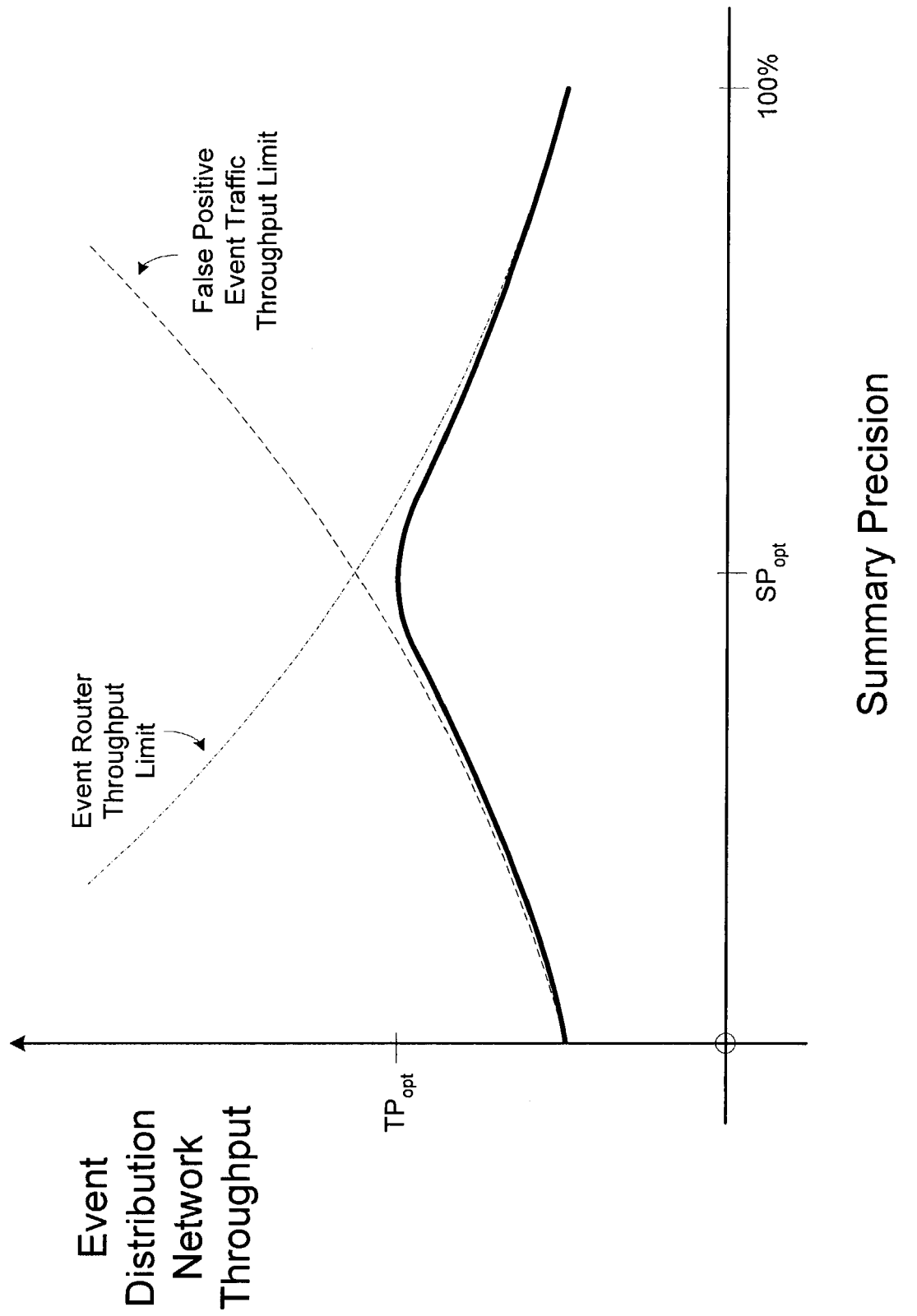
FIG. 7 is a graph showing maximum system throughput occurring at an imprecise level of summary precision in accordance with an aspect of the invention.

FIG. 7 graphically illustrates a theoretical effect of, in an embodiment of the invention, varying the level of summary precision used by an event router on event distribution network throughput (relative to event distribution networks that use no summary event routing or precise summary event routing). The horizontal axis is the level of summary precision used by an event router. The right limit of the graph is 100% summary precision, corresponding to an event router utilizing precise summaries. The left limit of the graph is 0% summary precision, corresponding to an event router utilizing no summary. A point elsewhere on the graph corresponds to an event router utilizing an imprecise summary. An imprecise summary is a subscription filter set summary (or equivalently, a subscription set summary) with a level of summary precision less than 100% (i.e., less than a precise summary) and greater than 0% (i.e., greater than no summary). The vertical axis is event distribution network throughput.

FIG. 7 illustrates, in accordance with an embodiment of the invention, the predicted effect that as summary precision is reduced from 100%, subscription filter summaries used by an event router become less complex. In an embodiment of the invention, less complex subscription filter summaries result in a lower per-event processing time at an event router, so that event router throughput is higher. That is, as subscription filter summary precision is lowered, event router throughput is raised. However, at the same time, reducing summary precision below 100% results in false positive event traffic, that is, in events being routed to matcher nodes that do not host subscriptions for those events. In an embodiment of the invention, false positive event traffic increases internal event distribution network bandwidth utilization and decreases matcher node throughput. An optimal event distribution network throughput ($TP_{opt}$) and the corresponding optimal subscription filter summary precision used by network event routers ($SP_{opt}$) occur when an increase in event distribution network throughput as a result of reduced summary precision is balanced by a decrease in event distribution network throughput as a result of increased false positive event traffic. The actual optimal level of summary precision varies in accordance with various embodiments of the invention. Factors affecting the optimal level of summary precision include processing power of the matchers and event routers, event distribution network bandwidth, and the dimensionality of events, subscriptions and subscription summaries.

The principle illustrated by FIG. 7 is used to optimize event distribution network throughput in relatively simple event distribution networks with a single event router, such as the example depicted in FIG. 3. It is also used in more sophisticated event distribution networks with multiple nodes that serve in the role of event router, such as the example depicted in FIG. 4. Where there are multiple nodes serving in the role of event router, each may have the same level of summary precision, but this is not necessary. In addition, a matcher node may itself utilize an imprecise summary of the subscription filter set associated with the subscriptions hosted by the matcher to prescreen events before undertaking the full matching operation. Although this technique is only useful where the level of summary precision used by an event router is significantly lower than that used by the matcher, e.g., no summary. An embodiment of the invention includes the capability to utilize an imprecise level of summary precision in order to optimize event distribution network throughput.

In an embodiment of the invention, the optimal level of summary precision is investigated by manually adjusting summary precision during a period of typical event traffic and measuring the throughput of the event distribution network. Preferably starting with 100% precision and relaxing it until the maximum of the graph illustrated in FIG. 7 is detected. In an alternative embodiment of the invention, the optimal level of summary precision is investigated by making a copy of the subscriptions hosted by an event distribution network and placing those subscriptions in a suitable event distribution network simulation environment. Using the simulation environment, graphs of event distribution network throughput versus summary precision are constructed for varying types of event traffic (e.g., in terms of event frequency and distribution in event space), including typical event traffic. The optimal level of summary precision generally corresponds to the peak of the graph for typical event traffic. However, the graphs for atypical event traffic are given due weight (i.e., in proportion to their likelihood) and if it is determined that there is a different summary precision that results in a higher event distribution network throughput over a range of event traffic conditions, then that different summary precision is selected. An advantage of using a simulation environment is that it is also able to be used to determine the effects on event distribution network throughput of changing event distribution network variables such as the number of event router nodes, event router node characteristics (e.g., per-event routing time), the number of matcher nodes, matcher node characteristics (e.g., per-event matching time), available bandwidth, and so on.

As new subscriptions are added to an event distribution network, the optimal level of summary precision changes. It is desirable for the event distribution network to be able to automatically adjust the level of summary precision used in event routing so as to optimize event distribution network throughput. An event distribution network incorporating an aspect of the invention is so enabled. In an embodiment of the invention, each event router node in the event distribution network monitors its own node resource utilization. If an event router node determines that it is overloaded, the event router decreases the level of summary precision it uses to route events so as to prevent becoming an event distribution network bottleneck. If the event router node determines that it is under-utilized, the event router increases the level of summary precision that it uses to route events so as to reduce the negative effects of false positive event traffic on event distribution network throughput. There may be periods during the lifetime of the event distribution network that the optimal level of summary precision is 100%, corresponding to a precise summary, or 0%, corresponding to no summary (i.e., multicast), but in general the optimal level occurs at some imprecise (i.e., intermediate) level of summary precision. In addition, the event router node optionally includes a suitable mechanism for dampening oscillations in summary precision, for example, increasing the time period between summary precision adjustments if oscillation is detected.

An R-tree is an example of a data structure incorporated into an embodiment of the invention to index subscription filter summaries for efficient matching and to support variable summary precision. The R-tree data structure is well known in the art, so only some of its features are highlighted here. An R-tree is a dynamic index structure for multi-dimensional data rectangles (e.g., subscription filter rectangles). It is a height balanced tree similar to a B-tree, with the data rectangles residing at the leaf nodes. Each non-leaf node may have two or more child nodes. Each non-leaf node maintains a minimum bounding rectangle of each of the rectangles associated with its child nodes.

Figure 8A:
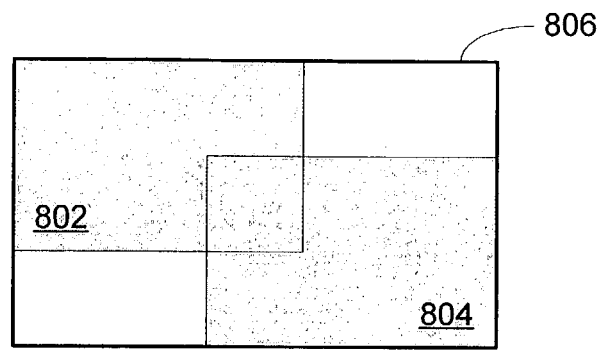
FIG. 8A is a schematic representation of event space showing two subscription rectangles and their minimum bounding rectangle.

One of the reasons that an R-tree data structure is suitable for use in an embodiment of the invention is that a minimum bounding rectangle of a set of subscription filter rectangles is an imprecise summary of the subscription filters. FIG. 8A illustrates the concept of a minimum bounding rectangle. A first subscription filter rectangle 802 and a second subscription filter rectangle 804 have a minimum bounding rectangle 806. Both filter rectangles 802, 804 are required for a precise summary. The single bounding rectangle 806 is utilized in an embodiment of the invention as an imprecise summary. An event router utilizing the bounding rectangle 806 to route events to a matcher hosting the subscription filter rectangles 802, 804 makes the routing decision in half the time because it must only match the event against one rectangle instead of two. However, events that fall within the un-shaded portions of the bounding rectangle 806 would be routed, resulting in false positive event traffic.

An R-tree with the maximal elements of a subscription filter set as its leaf nodes is used by an event router to efficiently route events at a summary precision of 100%, that is, in this case the R-tree is indexing a precise summary of the subscription filter set. In an embodiment of the invention, in order to reduce summary precision, the number of R-tree leaf nodes are reduced. At least two of the R-tree leaf nodes are replaced with a single new leaf node. The data rectangle associated with the single new leaf node is the minimum bounding rectangle of the data rectangles associated with the leaf nodes that are replaced. Replacing only two leaf nodes with a single new leaf node provides for a minimum step of summary precision reduction. It may be efficient to utilize larger steps of summary precision reduction, particularly where non-leaf nodes of the R-tree typically have more than two child nodes. Increasing the level of summary precision is the inverse of the reduction process, e.g., a single leaf node of an imprecise summary is replaced by the at least two original leaf nodes that it summarized.

For a sufficiently large number of data rectangles, variations on this R-tree leaf node replacement scheme are used by an embodiment of the invention to achieve essentially arbitrary levels of summary precision, although the steps between levels of precision become larger at lower levels of precision. For example, if an R-tree has 100 data rectangles representing the maximal elements of a subscription filter set as its leaf nodes and two of those leaf nodes are replaced with a single leaf node, the resulting R-tree indexes an imprecise summary of the subscription filter set at a 99% level of summary precision. If two pairs of leaf nodes are each replaced with a single leaf node, the level of summary precision is 98%, and so on. At a 50% level of summary precision, each of the original leaf nodes has been paired and each pair replaced by a single new leaf node. In this case, a measure of the level of precision of a summary of a subscription filter set is calculated as the ratio of the number of rectangles in the imprecise summary to the number of rectangles in the precise summary.

Figure 9A:
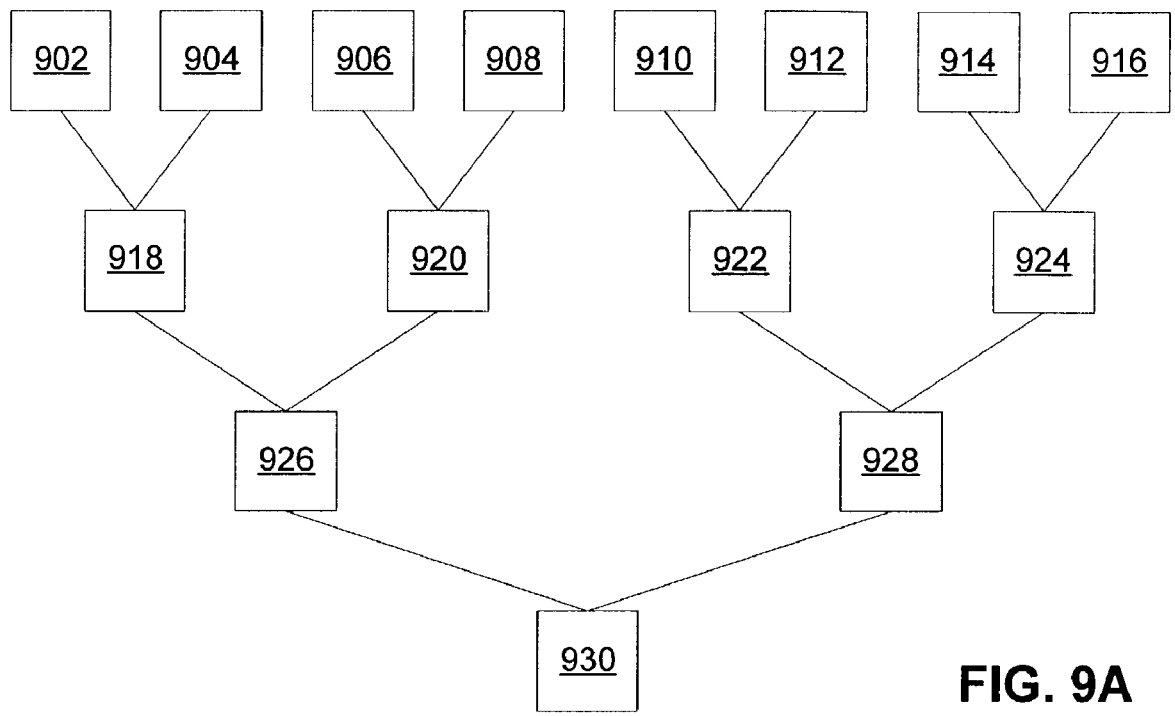
FIG. 9A is a schematic diagram of an R-tree that indexes a precise summary of a subscription filter set.

FIG. 9A shows an example R-tree indexing a precise summary of a subscription filter set. The data rectangles associated with R-tree leaf nodes 902, 904, 906, 908, 910, 912, 914, 916 are the maximal elements of a subscription filter set. The data rectangle associated with each of the non-leaf nodes 918, 920, 922, 924, 926, 928, 930 is the minimum bounding rectangle of its child nodes, for example, the data rectangle associated with a non-leaf node 918 is the minimum bounding rectangle of its child nodes 902, 904. In this example each non-leaf node has two child nodes. This is not necessary, although typically the number of child nodes is some power of two.

Figure 9B:
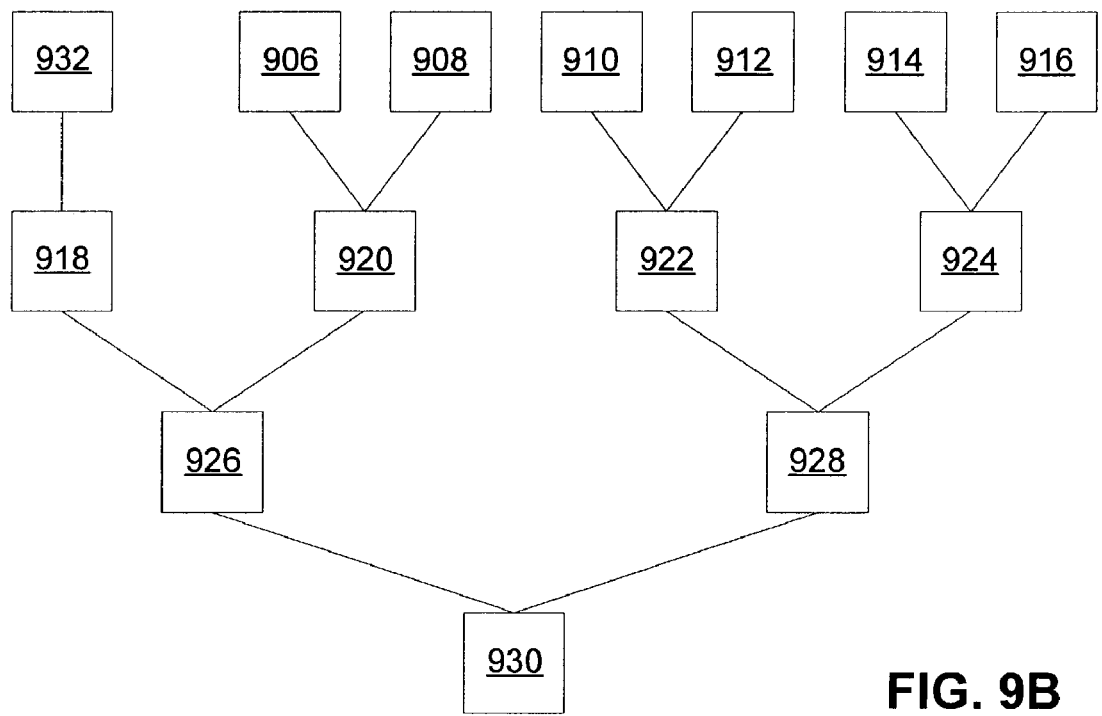
FIG. 9B is a schematic diagram of an R-tree that indexes an imprecise summary of a subscription filter set in accordance with an embodiment of the invention.

FIG. 9B shows the R-tree of FIG. 9A modified to index an imprecise summary of the same subscription filter set. A pair of leaf nodes (902, 904 in FIG. 9A) has been replaced by a new leaf node 932. The data rectangle associated with the new leaf node 932 is the minimum bounding rectangle of the data rectangles associated with the leaf nodes (902, 904 in FIG. 9A) that have been replaced. This is an example of a particularly efficient summary precision reduction because the minimum bounding rectangle of the replaced leaf nodes (902, 904 in FIG. 9A) was already maintained by their R-tree parent (918 in FIG. 9A). Where the precise summary had eight leaf nodes, the imprecise summary has seven, so the level of summary precision is ⅞ or 87.5%. In this example, the level of summary precision is restored to 100% by restoring the removed leaf nodes (902, 904 in FIG. 9A) as child nodes of node 918.

A Bloom filter is another example of a data structure used by an embodiment of the invention to store subscription filter summaries for efficient matching and to support variable summary precision. Where a subscription filter comprises only equality predicates (e.g., Symbol=MSFT) or where an important subset of subscription filter predicates are required to be equality predicates, data structures even more efficient than an R-tree are used by an embodiment of the invention.

An example of a precise summary of a subscription filter set that is used in this case is a symbol dictionary. One way of utilizing a symbol dictionary for event routing is presented to provide context for comparison with an embodiment of the invention. For each event attribute that is filtered utilizing only equality predicates (each "equality filtered attribute"), the symbol dictionary at an event router is loaded with the symbols contained in the subscription filter set hosted by a matcher. The result is one or more symbol dictionaries at the event router for each matcher. When a newly published event arrives at the event router, the event router determines, for each equality filtered attribute, if the attribute value is contained in the corresponding symbol dictionary. If it is, the event is routed to the corresponding matcher. In an embodiment of the invention where there are multiple equality filtered attributes, the attribute value must be contained in each corresponding symbol dictionary in order for the event to be routed.

When the number of symbols in a symbol dictionary becomes sufficiently large, an event router utilizing the symbol dictionary as a precise summary will become an event distribution network bottleneck. In an embodiment of the invention, a Bloom filter is used as an imprecise summary in place of the symbol dictionary. The Bloom filter is well known in the art, so only some of its features are highlighted here. Like the symbol dictionary, the Bloom filter is loaded with a set of symbols, but instead of a symbol list, the Bloom filter is a bit vector, making it more efficient for a large number of symbols (e.g., over 100,000 symbols). Various bits are set in the vector corresponding to each symbol. The bits to set are selected by a hash function. To check if a symbol has been loaded into the bit vector, the symbol is run through the same hash function. If the corresponding bits are set in the bit vector, then there is a high probability that the symbol has previously been loaded into the bit vector (i.e., the symbol falls within the Bloom filter). The hash function is chosen to make the Bloom filter useful as a filter but it does not guarantee that a symbol hash is unique or, for example, that a symbol hash will not collide with some combination of other symbol hashes. There is some level of false positive match.

When, in an embodiment of the invention, the Bloom filter is incorporated into an event router as an imprecise summary, there is a gain in event router throughput at the expense of some false positive event traffic. The level of false positive traffic and thus the effective level of summary precision is set by varying the width of the Bloom filter bit vector. The discussion with reference to FIG. 7 applies. As in the R-tree example, event distribution network throughput is increased by utilizing an imprecise summary.

In an embodiment of the invention, utilizing imprecise summaries increases event router node throughput at the cost of some increase in false positive event traffic. False positive traffic has a negative impact on bandwidth utilization and matcher node throughput. Another factor effecting false positive event traffic is the way in which the subscriptions hosted by a multi-node publish/subscribe service are partitioned (i.e., divided up) among the matcher nodes. If the subscriptions are partitioned randomly, as in some prior art systems, the subscriptions hosted by each matcher node will, in general, have poor locality, that is, the filter rectangles associated with the subscriptions will be spread out across event space, rather than concentrated in one portion of it.

Figure 8B:
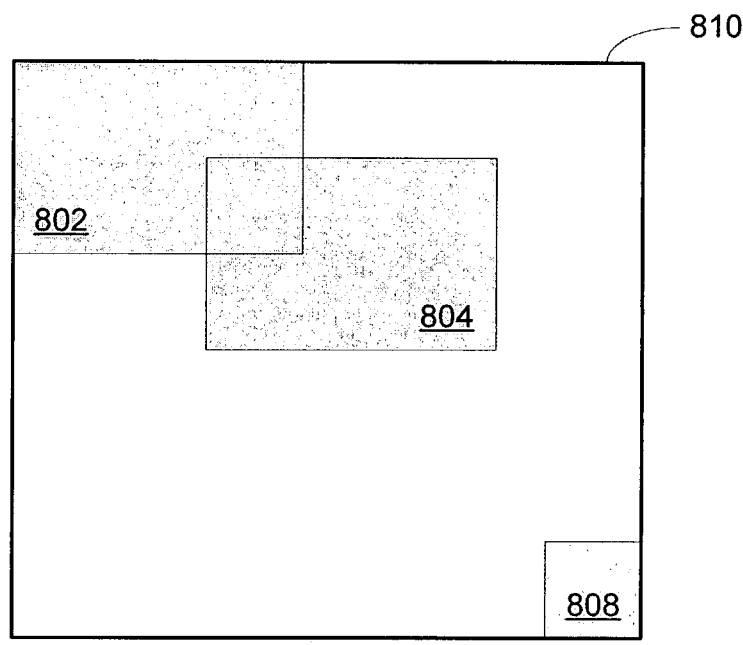
FIG. 8B is a schematic representation of event space showing three subscription rectangles with worse locality than those of FIG. 8C.
Figure 8C:
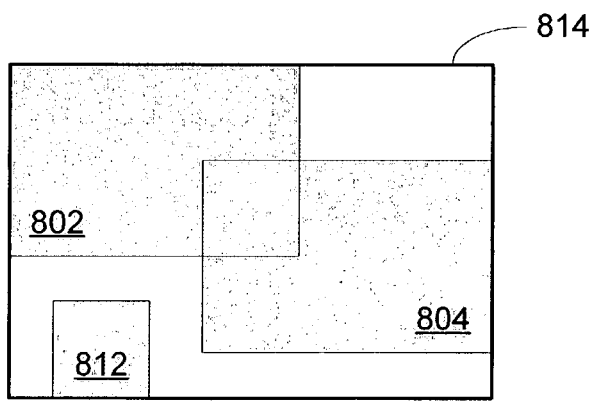
FIG. 8C is a schematic representation of event space showing three subscription rectangles with better locality than those of FIG. 8B.

FIG. 8B and FIG. 8C help illustrate the concept of locality. In FIG. 8B, a filter rectangle 808 is added to the subscription filter set 802, 804. The new subscription filter set 802, 804, 808 has relatively poor locality. If the minimum bounding rectangle 810 of the subscription filter set 802, 804, 808 is used as an imprecise summary by an event router it will route a relatively high level of false positive event traffic to the matcher hosting the subscription filter set 802, 804, 808. FIG. 8C provides a comparison. In FIG. 8C, a filter rectangle 812 is added to the subscription filter set 802, 804. The new subscription filter set 802, 804, 812 has relatively good locality. If the minimum bounding rectangle 814 of the subscription filter set 802, 804, 812 is used an as imprecise summary by an event router, it will route a relatively low level of false positive event traffic to the matcher hosting the subscription filter set 802, 804, 812. The minimum bounding rectangle of a set of subscriptions is the same as the minimum bounding rectangle of a subscription filter set associated with the subscriptions. The summary of a set of subscriptions is the same as the summary of a subscription filter set associated with the subscriptions.

In an embodiment of the invention, if a set of subscriptions has poor locality then, for a given level of summary precision, an imprecise summary of the subscriptions will be broader than if the set of subscriptions had good locality. A broader imprecise summary at a given level of summary precision theoretically results in additional false positive event traffic without an increase in event router node throughput. In an embodiment of the invention, partitioning subscriptions so that the set of subscriptions hosted by each matcher node has good locality results in less false positive event traffic for a given level of event router node throughput or equivalently, higher event router node throughput for a given level of false positive event traffic. This in turn allows a higher event distribution network throughput for a given level of summary precision, that is, the peak of the graph illustrated by FIG. 7 is higher. In addition to partitioning for good locality, an embodiment of the invention partitions in order to avoid overloading any one matcher node. In an embodiment of the invention, the goal of partitioning to avoid overloading any one matcher node competes for priority with the goal of partitioning for good locality. Overloaded matcher nodes result in suboptimal event distribution network throughput, so a balance between the two partitioning goals is desirable.

There are two basic approaches to subscription partitioning: event space partitioning (ESP) and filter set partitioning (FSP). In event space partitioning, each matcher node is assigned responsibility for an area of event space. Event space partitioning is achieved by assigning a subscription to a matcher node if the subscription filter associated with the subscription falls within the area of event space for which the matcher node is responsible. If a subscription filter associated with a subscription is cut by one or more partitions, the subscription must be replicated on the matcher nodes responsible for each of the areas that the subscription filter covers. An advantage of event space partitioning is that each newly published event is routed to at most one matcher node. However, the disadvantage of having to replicate a subscription across multiple matcher nodes makes filter set partitioning preferable. In filter set partitioning, each subscription is assigned to a single matcher node. If two or more subscriptions on different matcher nodes have subscription filters that match the same event, then the event is routed to multiple matcher nodes.

Figure 10A:
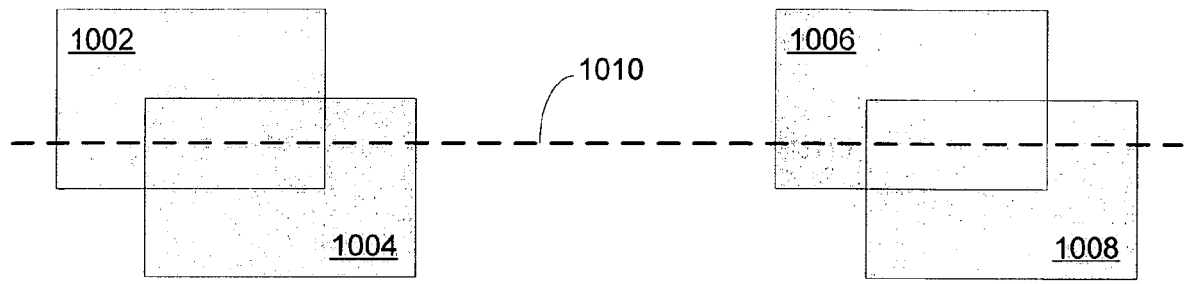
FIG. 10A is a schematic representation of event space showing four subscription rectangles and an event space partition.
Figure 10B:
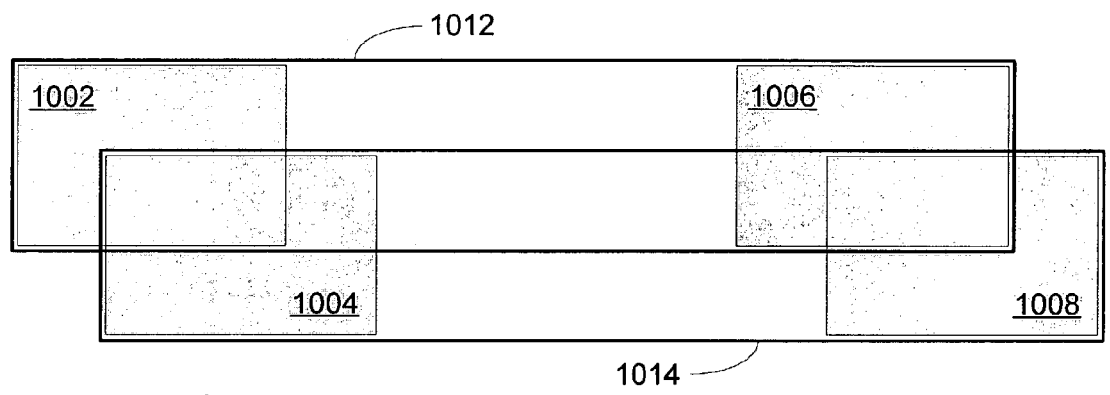
FIG. 10B is a schematic representation of event space showing one filter set partitioning of the subscription rectangles of FIG. 10A.
Figure 10C:
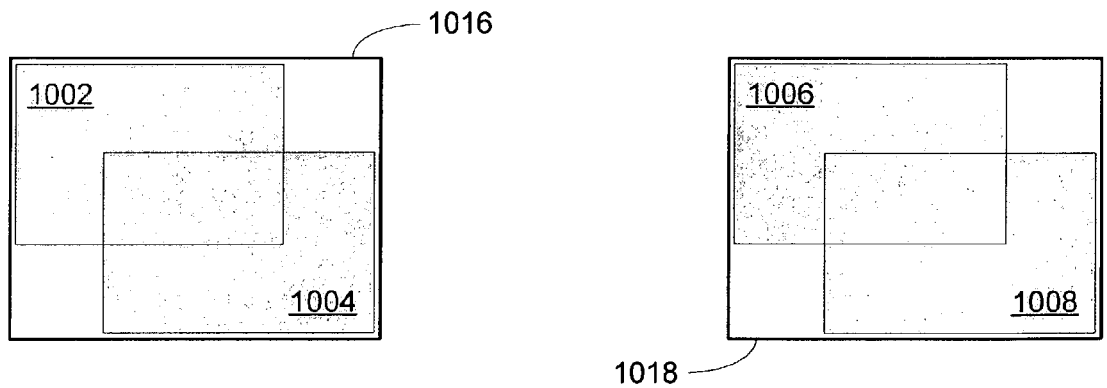
FIG. 10C is a schematic representation of event space showing another filter set partitioning of the subscription rectangles of FIG. 10A.

FIG. 10A, FIG. 10B and FIG. 10C show four filter rectangles 1002, 1004, 1006, 1008 that are to be partitioned. Each figure shows those four filter rectangles partitioned in a different way. FIG. 10A shows an event space partition (ESP) 1010 dividing the event space into two areas: upper and lower. Each of the subscriptions associated with the four filter rectangles will be replicated on the matcher node responsible for the upper event space and the matcher node responsible for the lower event space. FIG. 10B shows one filter set partitioning (FSP) of the four filter rectangles 1002, 1004, 1006, 1008. Two filter rectangles 1002, 1006 are assigned to one filter set partition 1012. The other two filter rectangles 1004, 1008 are assigned to a second filter set partition 1014. An event occurring in the event space covered by the intersection of filter rectangles 1002 and 1004 will be routed to the matcher node responsible for the first partition 1012 as well as to the matcher node responsible for the second partition 1014. FIG. 10C shows another filter set partitioning (FSP) of the four filter rectangles 1002, 1004, 1006, 1008. Two filter rectangles 1002, 1004 are assigned to one filter set partition 1016. The other two filter rectangles 1006, 1008 are assigned to a second filter set partition 1018. An event occurring in the event space covered by the intersection of filter rectangles 1002 and 1004 will be only routed to the matcher node responsible for the first partition 1016. The filter set partitions depicted in FIG. 10C have better locality than the filter set partitions depicted in FIG. 10B. Visually, for example, the unshaded area within filter set partition 1016 is less than the unshaded area within filter set partition 1012. In an embodiment of the invention, the filter set partitions depicted in FIG. 10C result in less false positive event traffic than the filter set partitions depicted in FIG. 10B.

In an embodiment of the invention there are two modes of subscription partitioning: offline partitioning and online partitioning. Offline partitioning begins with a set of subscriptions and is free from real-time time constraints (i.e., the partitioning occurs over minutes or hours rather than completing in seconds or in fractions of a second). Examples of when offline partitioning is used in an embodiment of the invention include: when a successful service transitions from a single node publish/subscribe service to a multi-node publish/subscribe service, and periodically repartitioning a multi-node publish/subscribe service. In an embodiment of the invention, online partitioning takes place in an operational event distribution network where an established partitioning already exists and the assignment of a subscription to a matcher node occurs in real-time. Online partitioning is also known as new subscription routing. In an embodiment of the invention, subscription router 304 in FIG. 3 utilizes online partitioning. In an embodiment of the invention, each EDN node 402, 404, 406, 408, 410, 412, 414 in FIG. 4 utilizes online partitioning when serving in the role of subscription router.

An embodiment of the invention utilizes an R-tree to implement an offline filter set partitioning in which the set of subscriptions assigned to each matcher node has good locality and which avoids overloading any one matcher node. A given set of subscriptions is to be divided into a number of partitions equal to the number of matcher nodes in an event distribution network. First, the number of children of the root node of the R-tree is set equal to the number of destination matcher nodes. A top-down R-tree loading algorithm is utilized to load the R-tree with the subscription filter rectangles associated with the set of subscriptions. Top-down R-tree loading algorithms are known in the art, so only some of their features are highlighted here.

At each level of the R-tree (for example, in FIG. 9A nodes 926 and 928 are a level, and nodes 918, 920, 922 and 924 are another level) the filter rectangles are partitioned as follows. First, the filter rectangles are sorted based on their minimum, maximum and center coordinates in each dimension. Then, each cut orthogonal to the coordinate axes that would result in a balanced and packed R-tree is considered. Next, the cut that minimizes a cost function is greedily selected (i.e., selected without regard for a global optimum). Finally, like cuts are applied recursively to the newly created partitions until the desired number of partitions at a level is achieved. Each level is added in turn until the desired number of rectangles per partition is achieved.

In an embodiment of the invention, the cost function is chosen to be the sum of the areas of the minimum bounding rectangles of the two candidate subscription filter sets on the two sides of a cut. If published events are uniformly distributed throughout the event space, minimizing this sum corresponds well to minimizing the sum of event traffic. In an embodiment of the invention, once the R-tree is loaded, the set of subscription filters indexed by each sub-tree rooted at a child of the root node is assigned to a matcher node. An R-tree has been used by prior art systems to efficiently implement the matching operation of a matcher node. In an embodiment of the invention, the set of subscription filters indexed as well as the indexing sub-tree rooted at a child of the root node are assigned to a matcher node, to be used by the matcher node to implement the matching operation.

An embodiment of the invention utilizes an R-tree to implement an online filter set partitioning in which a new subscription is assigned to a matcher node so as to maintain good locality while avoiding overloading any one matcher node. An event distribution network has a number of matcher nodes, each hosting a set of subscriptions. In an embodiment of the invention, a subscription router node utilizes R-trees to index a subscription filter set summary for each matcher node. Both precise and imprecise summaries are suitable for new subscription routing.

In an embodiment of the invention, a new subscription arrives at the subscription router node and then the subscription is routed to a matcher node as follows. At first each matcher node is a candidate to host the new subscription. The subscription router node eliminates those candidates that are already loaded above a threshold (e.g., 2, 3 or 4 times the average matcher node load). In an embodiment of the invention, allowing a higher level of load imbalance results in better subscription locality of each matcher node. For each of the remaining candidates, the amount of overlap between the filter rectangle associated with the new subscription and the data rectangles of each of the leaf nodes of each of the candidate R-trees is calculated. The candidate matcher node associated with the R-tree whose leaf node resulted in the greatest overlap is selected. The new subscription is routed to the selected matcher node for hosting.

In an embodiment of the invention, the matcher node that the new subscription is routed to, itself utilizes an R-tree to efficiently implement the matching operation. The filter rectangle associated with the new subscription is added to the R-tree in the following manner. Starting at the root node of the R-tree, each child node is a candidate. Recall that each non-leaf node maintains the minimum bounding rectangle of its child nodes. For each child node, the minimum bounding rectangle area if the new filter rectangle were added is calculated. The child node with the minimum increase in minimum bounding rectangle area is greedily selected (i.e., selected without regard for a global optimum). Each child of the selected node is now a candidate, and the process is repeated until a node is found where the new filter rectangle is able to be added as a leaf node. In this way, filter rectangles with large intersections will reside at leaf nodes that are close to each other in the R-tree. In an embodiment of the invention, a subscription filter summary implemented utilizing an R-tree will then have better locality than if the matching R-tree was grown randomly.

In an embodiment of the invention, for a given set of subscriptions, an event distribution network that utilizes only online filter set partitioning has partitions with poorer locality than an event distribution network that utilizes only offline filter set partitioning. An initial offline partitioning in combination with ongoing online partitioning results in partitions with better locality than online filtering alone.

In an embodiment of the invention where some subset of the subscription filter predicates are required to be equality predicates, event space partitioning of those predicates is desirable. Equality predicates can not be cut by an event space partition, so that event space partitioning of equality predicates has the advantage of routing each newly published event to at most one matcher node without the disadvantage of having to replicate subscriptions. Subscription locality isn't an issue for event space partitioning in the same way that it is for filter set partition, so the focus for optimizing event distribution network throughput is on matcher node load balancing.

In an embodiment of the invention, fine-grained load balancing without the need for repartitioning is achieved by initially over-partitioning the event space, e.g., forty partitions for four matcher nodes, and assigning multiple event space partitions to each matcher node. When a load imbalance is detected, the responsibility for one or more partitions is moved from a most heavily loaded matcher node to other less loaded matcher nodes. In an embodiment of the invention, moving responsibility for a partition from one matcher node to another comprises reassignment on a partition map maintained at an event router and migration of the subscriptions associated with the partition if the subscriptions are not already present on the destination matcher node.

In an embodiment of the invention, assigning partitions to matcher nodes takes place in the following manner. First, each partition is assigned a weight corresponding to the load a matcher node will incur if assigned the partition. Next, the partitions are sorted in order of decreasing weight. Then, each partition in the sequence is assigned to the matcher node that has the minimum load at that point in the sequence. This algorithm is known in the art, so only some of its features are described here. In an embodiment of the invention, the weight utilized to sort a partition comprises the product of the number of subscriptions in the partition and the number of unique equality predicates associated with the subscriptions in the partition. In an embodiment of the invention, a like algorithm is utilized to reassign partitions from a most heavily loaded matcher node to less heavily loaded matcher nodes.

Figure 11C:
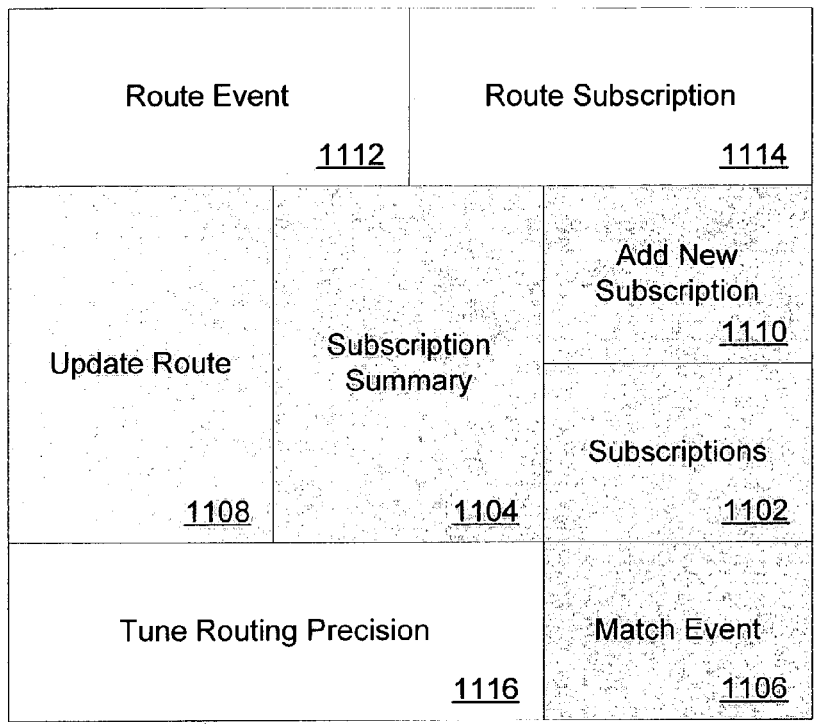
FIG. 11C is a block diagram of an event distribution network node configured as an event matcher in accordance with an embodiment of the invention.
Figure 11D:
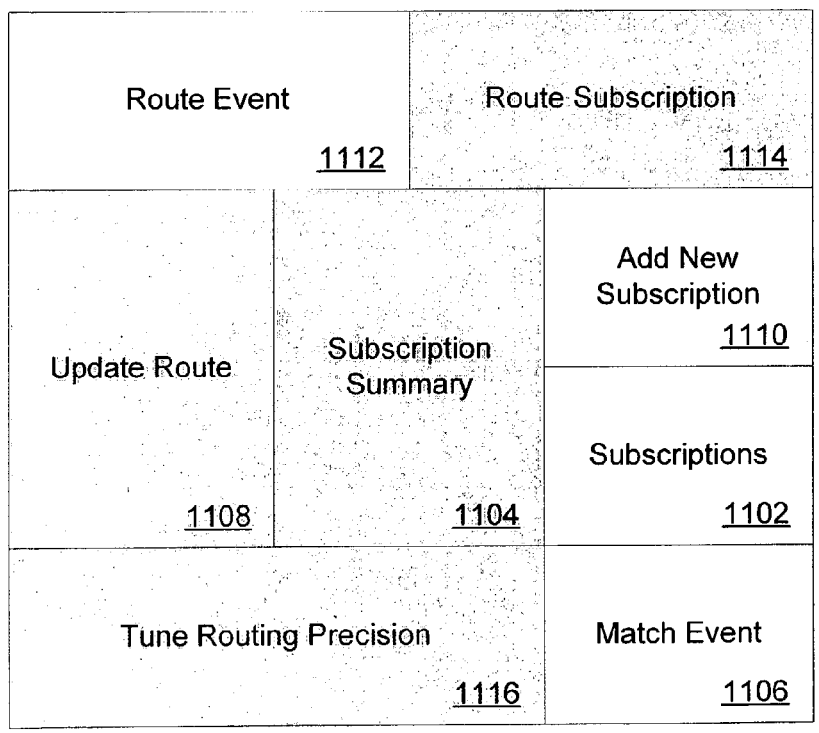
FIG. 11D is a block diagram of an event distribution network node configured as a subscription router in accordance with an embodiment of the invention.

FIG. 11A shows an EDN node architecture suitable for use in an event distribution network that incorporates aspects of the invention. In an embodiment of the invention, unless otherwise specified, each EDN node architecture module is capable of communicating with and invoking the functionality of another EDN node architecture module whether or not the modules are, for example, adjacent in the figure. FIG. 11B shows the modules utilized by an EDN node configured as a dedicated event router node, such as event router 312 in FIG. 3. Shaded modules 1104, 1112, 1108, 1116 are in active use in a dedicated event router node. Unshaded modules 1102, 1106, 1114, 1110 are either inactive or not present in a dedicated event router node. When a module is inactive, the module is not communicated with and its functionality is not invoked. When a module is not present, it is not possible to communicate with the module or to invoke its functionality. FIG. 11C shows the modules utilized by an EDN node configured as a dedicated matcher node, such as matcher 308 in FIG. 3. Shaded modules 1102, 1106, 1104, 1108, 1110 are in active use in a dedicated matcher node. Unshaded modules 1112, 1114, 1116 are either inactive or not present in a dedicated matcher node. FIG. 11D shows the modules utilized by an EDN node configured as a dedicated subscription router node, such as subscription router 304 in FIG. 3. Shaded modules 1104, 1114, 1108, 1116 are in active use in a dedicated subscription router node. Unshaded modules 1102, 1106, 1112, 1110 are either inactive or not present in a dedicated subscription router node.

In an embodiment of the invention, an EDN node such as EDN node 406 in FIG. 4 has each of the modules illustrated in FIG. 11A present. If an EDN node is serving in the roles of matcher, event router and subscription router, then each of the modules is active. If an EDN node is serving in the roles of event router and subscription router, the shaded modules shown in both FIG. 11B and FIG. 11D are active, and so on. In addition, in an embodiment of the invention, the functionality of an add new subscription module 1110 and a match event to subscriptions module 1106 is incorporated into a subscriptions module 1102. In an embodiment of the invention, the functionality of an update route module 1108 is incorporated into a subscription summary module 1104. Other variations are possible, as will be appreciated by one of skill in the art.

Referring to FIG. 11A, a subscriptions module 1102 maintains the subscriptions hosted by an EDN node. In an embodiment of the invention, the subscriptions module 1102 maintains an R-tree to index the filter rectangles associated with subscriptions hosted by the EDN node. A subscription summary module 1104 maintains one or more subscription filter set summaries. In an EDN node that serves in the role of matcher, a summary maintained by the subscription summary module 1104 is a precise summary of the subscription filter set associated with the subscriptions hosted by the EDN node (is a "precise subscription summary"). In an embodiment of the invention, a dirty flag is set in the subscriptions module 1102 whenever a new subscription is added to the set of subscriptions hosted by an EDN node and cleared whenever a precise subscription summary is updated to include new subscriptions. In an embodiment of the invention, the subscription summary module 1104 periodically (e.g., as triggered by a timer) determines whether the set of subscriptions maintained by the subscriptions module 1102 has changed (e.g., checks a dirty flag maintained by the subscriptions module 1102). If the set of subscriptions has changed since the previous summarization, the set of subscriptions is re-summarized. In an alternative embodiment, an update route module 1108 determines whether the set of hosted subscriptions has changed and the update route module triggers an update of the precise subscription summary if required. In another alternative embodiment, the subscriptions module 1102 itself triggers the precise subscription summary update whenever a new subscription is added. An add new subscription module 1110 is another module well suited to this role. Those of skill in the art will appreciate that other variations are possible.

In an EDN node that serves in the role of event router or subscription router, a subscription summary module 1106 maintains at least one summary for each matcher node to which the EDN node routes. In an exemplary embodiment of the invention, each summary is indexed by an R-tree. In an alternative embodiment, some of the summaries are maintained utilizing one or more Bloom filters.

The update route module 1108 propagates subscription filter set summaries throughout the event distribution network. In an EDN node serving in the role of matcher, in accordance with an embodiment of the invention, the update route module 1108 periodically determines whether the precise subscription summary has changed. If the precise subscription summary has changed, the update route module 1108 sends the updated precise subscription summary to each of the EDN nodes to which it is directly connected. In an alternative embodiment, the update route module 1108 periodically determines whether the set of hosted subscriptions has changed, triggers an update of the precise subscription summary if required and then sends the updated precise subscription summary to each of the EDN nodes to which it is directly connected. In an alternative embodiment, an updated precise subscription summary is sent only to directly connected EDN nodes serving in the role of event router.

In an EDN node serving in the role of event router and/or subscription router in an embodiment of the invention, the update route module 1108 receives updated precise subscription summaries from EDN nodes to which it is directly connected. In an embodiment of the invention, it is the responsibility of the matcher node whose set of hosted subscriptions changes to send an updated precise subscription summary to each EDN node in the event distribution network. In an alternative embodiment, the matcher node sends the update only to directly connected event router nodes and it is the responsibility of an event router node to propagate the updated precise subscription summary throughout the event distribution network. In an embodiment of the invention, received precise subscription summary updates are submitted to the subscription summary module 1104 where they are maintained.

In an embodiment of the invention, an event router node aggregates precise subscription summaries before propagating them to upstream event router nodes. For example, in the exemplary event distribution network illustrated in FIG. 4, the downstream EDN node 404 aggregates precise subscription summaries received from two EDN nodes 408, 410 before sending the aggregated precise subscription summary to upstream EDN node 402. In an embodiment of the invention, a subscription router node aggregates precise subscription summaries before propagating them to an upstream subscription router node.

The add new subscription module 1110 receives new subscriptions routed to an EDN node for hosting and adds them to the subscriptions module 1102. In an embodiment of the invention, the add new subscription module 1110 adds the new subscription to an R-tree maintained by the subscriptions module 1102 utilizing a method that maintains good subscription locality.

The match event module 1106 receives events routed to an EDN node for matching. A match event module matches a received event against each of the subscriptions maintained by the subscriptions module 1102. In an embodiment of the invention, the match event module 1106 exploits the properties of an R-tree index maintained by the subscriptions module 1102 to perform the matching operation efficiently. For each subscription that matches an event, the match event module 1106 sends an event notification to the notification address associated with the subscription. In an embodiment of the invention, the notification address of each matching subscription is added to a notification list and the notifications are generated after the matching operation is complete. In an embodiment of the invention where a notification service is available, the notification list and a copy of the event are sent to the notification service after the matching operation is complete.

A route event module 1112 receives newly published events from a publisher (not shown) as well as events routed from other EDN nodes. A received event is matched against a subscription filter set summary, for each directly connected EDN node (except an EDN node that was a source of the event) that serves in the role of event router or matcher. The subscription filter set summaries are those maintained by the subscription summary module 1104. The event is routed to each EDN node associated with a subscription filter set summary that matches the event. If the route event module 1112 resides on an EDN node that serves in the roles of event router and matcher, a received event is also matched against the subscription filter set summary for the EDN node. If the received event does match, it is submitted to the EDN node's match event module 1106. In an embodiment of the invention, the same matching engine is utilized by both the match event module 1106 and the route event module 1112.

A route subscription module 1114 receives new subscriptions from a subscriber (not shown). In an embodiment of the invention, a route subscription module 1114 also receives subscriptions routed from other EDN nodes. For each directly connected EDN node (except an EDN node that was a source of the subscription) that serves in the role of subscription router or matcher, the overlap between a received subscription and the subscription filter set summary for the EDN node is calculated. The subscription filter set summaries are those maintained by the subscription summary module 1104. The subscription filter set summaries are not necessarily those maintained for use by the route event module 1112, for example, subscription filter set summaries with a lower dimensionality are utilized by an embodiment of the invention to route subscriptions. Whereas subscription filter set summaries utilized to route events must guarantee correct event distribution network operation (e.g., that every matcher node that hosts one or more matching subscriptions that will match the event does receive the event), subscription filter set summaries utilized to route subscriptions need only result in an online partitioning that improves event distribution network throughput. The subscription is routed to the EDN node with the greatest overlap. If an EDN node receiving the new subscription serves in the roles of subscription router and matcher, the EDN node is also a candidate for hosting the subscription. If the subscription filter set summary of the EDN node receiving the new subscription has the greatest overlap with the new subscription, the new subscription is submitted to that EDN node's add new subscription module 1110. In an embodiment of the invention, the same matching engine is utilized by both the match event module 1106 and the route subscription module 1114.

Figure 12:
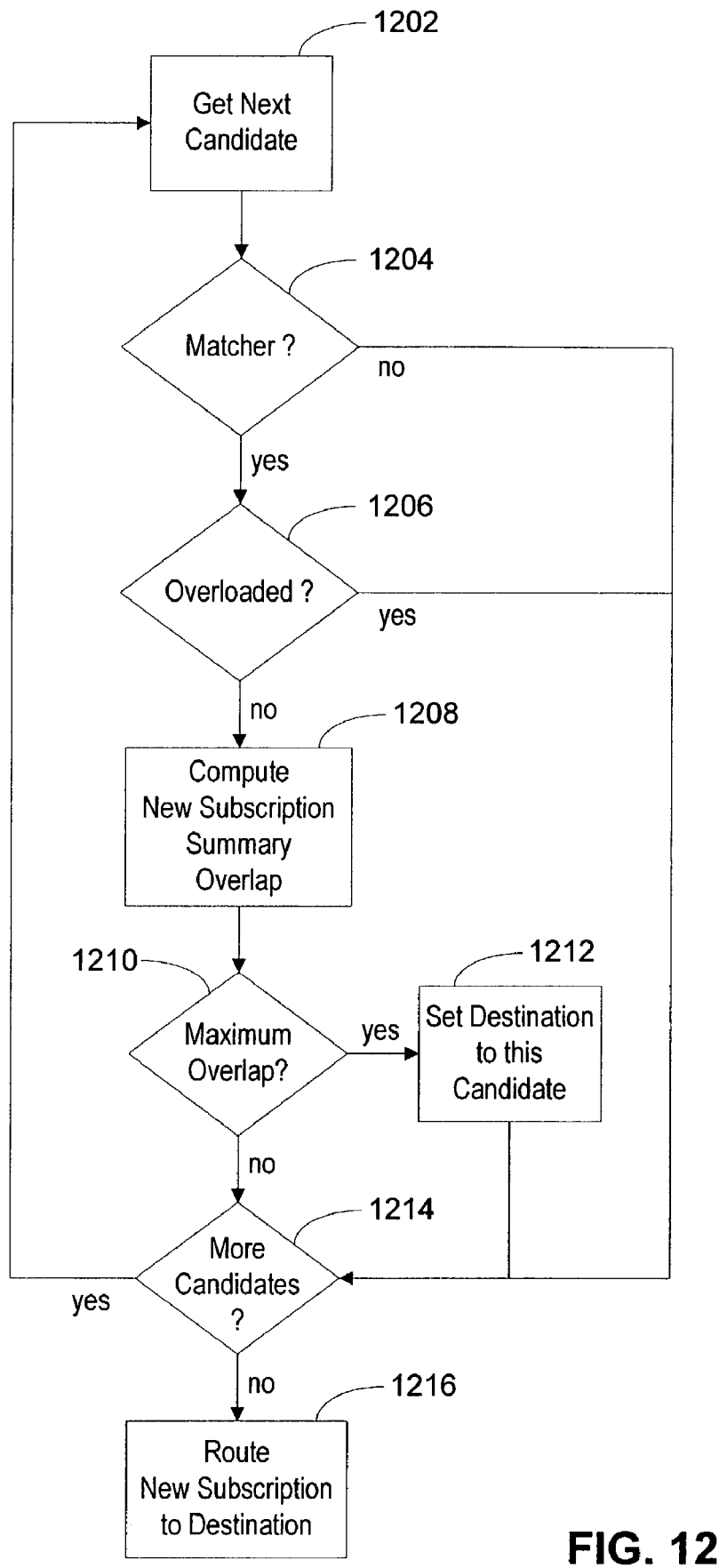
FIG. 12 is a flowchart depicting steps performed by a subscription router when selecting a matcher to host a new subscription in accordance with an embodiment of the invention.

FIG. 12 depicts in more detail a part of a procedure utilized by the route subscription module 1114 to select the routing destination for a subscription in an embodiment of the invention. The route subscription module 1114 has a list of candidate EDN nodes. At step 1202, a candidate EDN node is selected from the list. At step 1204, the candidate EDN node is examined to determine whether it is a matcher node capable of hosting the new subscription rather than, for example, a dedicated subscription router. If the EDN node is not capable of hosting the new subscription, it is eliminated as a candidate and the procedure progresses to step 1214. If the candidate EDN node does serve in the role of matcher, the procedure progresses to step 1206 where it is further determined whether or not the matcher node is overloaded. In an embodiment of the invention, each matcher node periodically updates each subscription router node with the current load of the matcher node. If the matcher node is overloaded, it is eliminated as a candidate and the procedure moves to step 1214 to determine whether there are any other candidates. Otherwise the procedure progresses from step 1204 to step 1208.

At step 1208, the overlap between the filter rectangle associated with the new subscription and the candidate EDN node's subscription filter summary is calculated. In an exemplary embodiment of the invention, the overlap is calculated as the largest of the intersections of the filter rectangle associated with the new subscription and each of the filter rectangles comprising the subscription filter summary. In an alternate embodiment, the overlap is calculated as the cumulative intersection of the filter rectangle associate with the new subscription and each of the filter rectangles comprising the subscription filter summary. At step 1210, it is determined whether the overlap just calculated is the maximum overlap calculated so far in the procedure. For example, in an embodiment of the invention, the summary with the largest event space intersection with the new subscription is the summary that has the maximum overlap with the new subscription. Making maximum overlap a new subscription routing criteria in an embodiment of the invention results in the maintenance of good hosted subscription set locality and thus minimizes new event traffic to a matcher due to the new subscription. If this is the maximum overlap, the procedure commences executing step 1212. Otherwise the procedure passes from step 1210 to step 1214 to determine whether there are any more candidates. At step 1212, the destination of the new subscription is set to be the current candidate EDN node, and the procedure passes to step 1214. At step 1214, it is determined whether there are any other candidates. If there are, the procedure returns to step 1202, otherwise the procedure moves to step 1216. At step 1216, the subscription is routed to the destination last set in step 1212.

Figure 13:
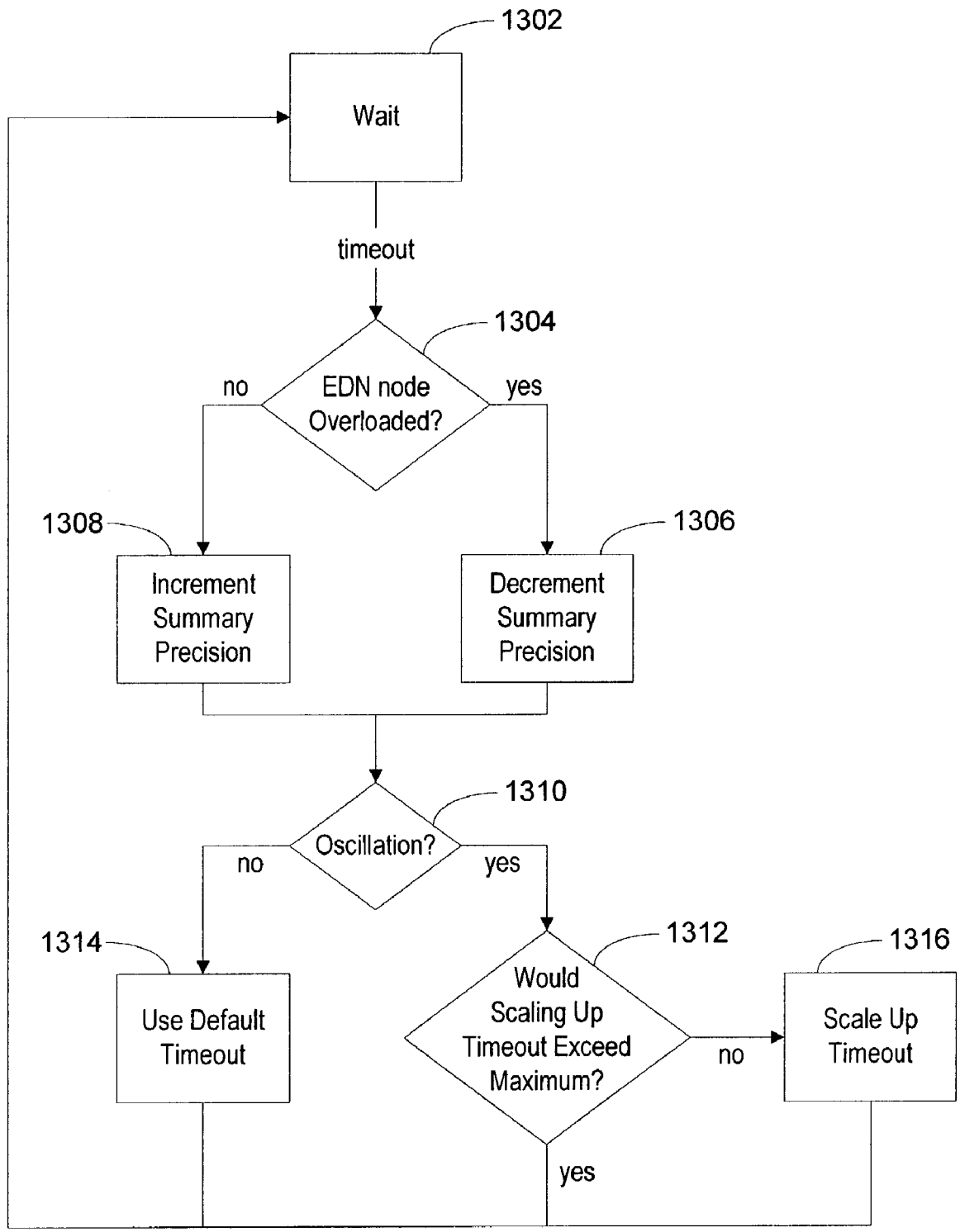
FIG. 13 is a flowchart depicting steps performed by an event router when automatically adjusting summary precision so as to maximize system throughput in accordance with an embodiment of the invention.

A tune routing precision module 1116 adjusts the precision of summaries maintained by subscription summary module 1104 to prevent an EDN node that serves in the role of event router or subscription router from becoming an event distribution network bottleneck. FIG. 13 depicts at a high level a procedure utilized by the tune routing precision module 1116 in an embodiment of the invention. At step 1302, the procedure waits for a period of time determined by a timeout value, initially set to a default value, for example, one minute. The waiting step is important because the tune routing precision module 1116 must not be a burden on the resources of the EDN node where it resides. When the timeout occurs, the procedure progresses to step 1304.

At step 1304, the load of the EDN node is determined (e.g., the average load over the last one minute) and compared to a high threshold (e.g., 96% of maximum load). If the load is above the threshold, the EDN node is overloaded and the procedure moves to step 1306. At step 1306, the precision of the subscription filter summaries utilized to route events and/or subscriptions is reduced in order to prevent the EDN node from becoming an event distribution network bottleneck. Otherwise the procedure moves from step 1304 to step 1308. In contrast to step 1306, at step 1308, the precision of the subscription filter summaries utilized to route events and/or subscriptions is increased in order to reduce false positive event traffic routed to matcher nodes.

Steps 1308 and 1306 provide for good tracking of optimal summary precision in response to changing event distribution network conditions but when conditions remain constant, the procedure results in an summary precision setting that oscillates around the optimum. In order to dampen any oscillations, the procedure moves to step 1310. At step 1310, the procedure examines the recent sequence of summary precision setting adjustments. If summary precision setting has been oscillating (e.g., up tick, down tick, three times in a row) without an increase in timeout value, the procedure moves to step 1312. If no oscillation is detected, then the optimum summary precision setting has not been found and the procedure moves to step 1314 where the timeout value is reset to the initial default timeout value. At step 1312, a check is made to ensure that scaling up the timeout value does not exceed a maximum (e.g., 24 hours) and if not, then the timeout value is scaled up by some factor at step 1316. A higher timeout scaling factor results in better summary precision setting stability at the expense of taking longer to detect a shift in the optimal summary precision. Once any adjustments to the timeout value have been made, the procedure returns to the wait step 1302.

In an embodiment of the invention, events, subscriptions and subscription summary updates are implemented utilizing XML messages. In addition, EDN nodes are implemented in the context of an extended Web Services framework utilizing SOAP-based protocols. XML messages, SOAP-based protocols and a standard Web Services framework are known in the art, so only some of their features are described here.

Figure 14:
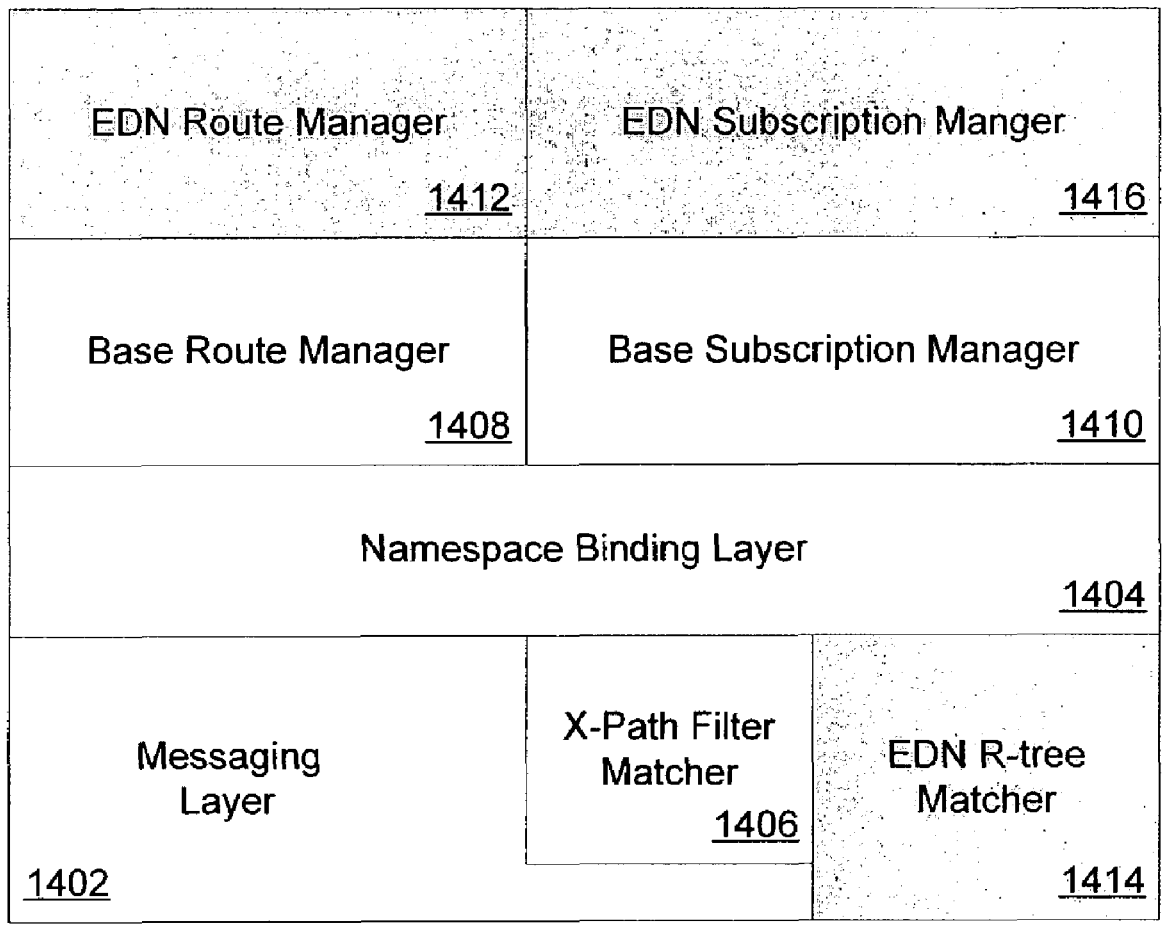
FIG. 14 is a block diagram of an extended Web Services framework used to implement an embodiment of the invention.

FIG. 14 illustrates the architectural components of a Web Services framework with event distribution network extensions (EDN-specific extensions shaded). In an embodiment of the invention, unless otherwise specified, each component is capable of communicating with and invoking the functionality of another component whether or not the components are, for example, adjacent in the figure. A Messaging Layer 1402 provides the infrastructure for sending and receiving XML messages between Web Services endpoints (e.g., EDN nodes). A Namespace Binding Layer 1404 maintains a hierarchical namespace (e.g., for publish/subscribe topics or routing table entries) and associates each name entry with a matcher class that would be instantiated to store the filters contained in XML messages sent to that name. When a new route or topic entry is created in the namespace, the XML creation message has the option of specifying a Uniform Resource Identifier (URI) that identifies the matching engine to utilize for handling any filter operations associated with the topic/route. The default matcher class in the framework is a standard X-Path Filter Matcher 1406, which is also utilized by the Messaging Layer 1402 for XML message dispatching.

A Base Route Manager 1408 registers a handler with the Messaging Layer 1402 to receive each incoming XML message, and utilizes a namespace layer instance and the matcher instances associated with its name entries to make routing decisions. It also registers another handler to receive route administration messages for creating, deleting, and enumerating route information. A Base Subscription Manager 1410 registers a handler to receive each XML message related to topic management, subscriptions, and event publications. In addition to supporting pluggable matcher and namespace implementations, the event distribution network extensions also allow applications to extend the base classes in order to add custom XML elements to base XML administrative messages and to override or include additional logic in route or topic management.

In an embodiment of the invention, an event router node runs an EDN Route Manager 1412 with namespace entries associated with an R-tree Route Set provided by an EDN R-tree Matcher 1414 (instead of the default X-Path Filter Matcher 1406). Implementing aspects of modules 1104, 1112 in FIG. 11A, an R-tree Route Set holds the set of summary R-trees, one from each matcher node, matches a newly published event against each tree, and returns a list of matcher nodes associated with the summaries that match the event. Subscription routing is implemented by calling a Route Closest function (instead of a Route Any function) on the same R-tree Route Set. An event router node starts an independent thread of execution to implement the summary precision adjustment function of FIG. 11A's tune routing precision module 1116. Each subscription and subscription filter set summary has a unique identifier associated with it which is returned to the originator. The unique identifiers are useful for efficient update and delete by the originator.

In an embodiment of the invention, a matcher node runs the EDN Route Manager 1412 to implement R-tree subscription routing, i.e., aspects of modules 1114, 1108 in FIG. 11A. The matcher node also runs an EDN Subscription Manager 1416 with namespace entries associated with an R-tree Matching Engine. The R-tree Matching Engine utilizes an R-tree matcher to implement a single-node filtering engine (i.e., aspects of modules 1102, 1106, 1110 in FIG. 11A) and another R-tree matcher to implement a summary manager that maintains a precise summary R-tree (i.e., aspects of module 1104 in FIG. 11A). In an embodiment of the invention, when the matcher node's routing R-tree is changed due to the insertion of new subscriptions, the updated R-tree is sent to the event router node's EDN Route Manager 1412 as an XML route update message, implementing aspects of modules 1102, 1104, 1108, 1110 in FIG. 11A.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computerized event distribution system, comprising:
   a source of event messages;
   a plurality of matchers for determining whether received ones of the event messages fall within an event message scope defined by each of a set of hosted subscriptions and issuing corresponding notification messages to corresponding subscriber clients; and
   at least one event message router communicatively coupled to the source of event messages and programmed to selectively pass event messages to the plurality of matchers, wherein the event message router is configured to maintain, for each one of the plurality of matchers, an imprecise summary of subscriptions for which each of the plurality of matchers is responsible the imprecise summary having a level of summary precision that is less than 100%;
   wherein the at least one event message router is programmed to pass some amount of false positive event messages to the plurality of matchers based on a level of precision of the imprecise summary of subscriptions for each one of the plurality of matchers; and
   wherein the at least one event message router is configured such that the level of precision of each imprecise summary of subscriptions is variable based at least in part on a load of the at least one event message router.

2. The system of claim 1, wherein the ax least one event router is further configured to maintain, for each one of the plurality of matchers, a plurality of imprecise summaries of subscriptions for which each of the plurality of matchers is responsible.

3. The system of claim 1, wherein each subscription for which a matcher is responsible comprises a set of predicates describing an area of event space.

4. The system of claim 3, wherein each subscription for which a matcher is responsible further comprises a notification address for notifying a subscriber if an event falls within the area of event space described byte set of predicates.

5. The system of claim 1, wherein a matcher is further configured to send a notification to a notification address associated with a subscription when an event matches the subscription.

6. The system of claim 1, wherein an imprecise summary of the set of subscriptions for which a matcher is responsible comprises a set of the maximal elements of a partially ordered set of the subscription filters associated with the subscriptions for which a matcher is responsible, wherein at least two of the maximal set elements have been replaced by their minimum bounding rectangle.

7. The system of claim 1, wherein the at least one event message router is configured to vary the level of precision of the imprecise summaries in response to a load of the at least one event message router.

8. The system of claim 1, wherein the at least one event message router is configured to reduce the level of precision of the imprecise summaries if the at least one event message router is overloaded.

9. The system of claim 8, wherein the at least one event message router is further configured to increase the level of precision of imprecise summaries if the at least one event message router load is under a threshold.

10. The system of claim 9, wherein the at least one event message router is further configured to dampen oscillations in the level of summary precision.

11. A computer-implemented method, comprising:
    assigning, to each of a plurality of matcher nodes, a subset of subscriptions hosted by an event distribution network;
    maintaining, at an event router node, for each of the plurality of matcher nodes, at least one imprecise summary of the subscriptions assigned to a matcher node, the at least one imprecise summary having a level of summary precision that is less than 100%;
    for each of the plurality of matcher nodes, reciving event messages at the event router node, the event messages comprising first event messages falling within the imprecise summary of the subscriptions assigned to matcher node and second false positive event messages falling outside of the imprecise summary of the subscriptions assigned to the matcher node, and passing all of the first event messages and at least some of the second false positive event messages from the event router node to the matcher node based on the imprecise summary of subscriptions for the matcher node; and
    varying a level of precision of at least one imprecise summary of subscriptions based at least in part on a load of the event router node.

12. The method according to claim 11, wherein maintaining an imprecise summary of the subscriptions assigned to a matcher nods comprises:
    receiving, from a matcher node, a precise summary of the subscriptions assigned to the matcher node; and
    reducing the level of precision of the precise summary.

13. The method according to claim 12, wherein the precise summary received by an event router node comprises the maximal elements of a partially ordered set of subscription filters associated with the subscriptions assigned to the matcher node, the maximal elements being indexed by an R-tree, and wherein reducing the level of precision of the precise summary comprises replacing at least a pair of the maximal elements indexed by adjacent R-tree leaf nodes with their minimum bounding rectangle.

14. The method according to claim 12, wherein the precise summary received by an event router node comprises a set of subscription filters associated with the subscriptions assigned to the matcher node, each subscription filter comprising a set of predicates on the attributes of an event schema and at least one of those predicates required to be an equality predicate, and wherein reducing the level of precision of the precise summary comprises, for each predicate required to be an equality predicate, loading a Bloom filter with that predicate from each subscription filter.

15. The method according to claim 11, further comprising measuring event distribution network throughput for different levels of precision of the imprecise summary maintained at an event router node.

16. The method according to claim 15, further comprising setting the level of precision of the imprecise summary maintained at an event router node to the level that resulted in the highest measured event distribution network throughput.

17. A computer-readable storage medium having stored thereon computer executable instructions for performing a method comprising:
assigning, to each of a plurality of matcher nodes, a subset of subscriptions hosted by an event distribution network;
maintaining, at an event router node, for each of the plurality of matcher nodes, at least one imprecise summary of the subscriptions assigned to a matcher node, the at least one imprecise summary level of summary precision is less than 100%;
for each of the plurality of matcher nodes, receiving event messages at the event router node, the event messages comprising first event messages falling within the imprecise summary of the subscriptions assigned to matcher node and second false positive event messages falling outside of the imprecise summary of the subscriptions assigned to the matcher node, and passing all of the first event messages and at least some of the second false positive event messages from the event router node to the matcher node based on the imprecise summary of subscriptions for the matcher node; and
varying a level of precision of at least one imprecise summary of subscriptions based at least in part on a load of the event router node.

18. A computerized first event distribution network node, comprising:
a subscription summary module configured to maintain an imprecise summary of subscriptions hosted by a second event distribution network node, the imprecise summary having a level of summary precision that is less tan 100%;
a route event module configured to route an event to the second event distribution network node if the event falls within the imprecise summary of subscriptions; and
a tune routing precision module configured to vary the level of precision of the imprecise summary of subscriptions maintained by the subscription summary module so as to vary a number of false positive events routed to the second event distribution network node based at least in part on a load of the event distribution node.

19. The computerized event distribution network node of claim 18, wherein the tune routing precision module is configured to reduce the level of precision of the imprecise summary of subscriptions maintained by the subscription summary module if the first event distribution network node is overloaded.

20. The computerized first event distribution network node of claim 19, wherein the tune routing precision module is further configured to increase the level of precision of the imprecise summary of subscriptions maintained by the subscription summary module if the first event distribution network node is under a threshold.

21. The computerized first event distribution network node of claim 20, wherein the tune routing precision module is further configured to dampen oscillations in the level of summary precision.

22. The computerized first event distribution network node of claim 18, further comprising an update route module capable of:
sending and receiving summaries of subscriptions hosted by the second event distribution network node; and
updating an imprecise summary maintained by the subscription summary module.

23. The computerized first event distribution network node of claim 22, wherein the update route module is further capable of aggregating summaries of subscriptions hosted by one or more event distribution network nodes.

24. The computerized first event distribution network node of claim 18, further comprising a route subscription module capable of routing a new subscription to an event distribution network node wit an imprecise summary of subscriptions already hosted by the event distribution network node that best covers the new subscription.

25. The computerized first event distribution network node of claim 18, wherein each imprecise summary is maintained in a Web Services namespace, wherein each event, each subscription and each subscription summary is capable of being represented by an extended mark-up language (XML) message, and wherein an event is routed to an event distribution network node in compliance with a simple object access protocol (SOAP).

26. The computerized first event distribution network node of claim 25, wherein each subscription summary is indexed by an R-tree.

* * * * *